US010301185B2

(12) United States Patent
Maurer et al.

(10) Patent No.: US 10,301,185 B2
(45) Date of Patent: May 28, 2019

(54) SOLIDOTHERMAL SYNTHESIS OF ZEOLITIC MATERIALS AND ZEOLITES OBTAINED THEREFROM

(71) Applicant: BASF SE, Ludwigshafen (DE)

(72) Inventors: Stefan Maurer, Shanghai (CN); Ulrich Müller, Neustadt (DE); Feng-Shou Xiao, Changchun (CN); Xiangju Meng, Hangzhou (CN); Qinming Wu, Hangzhou (CN)

(73) Assignee: BASF SE, Ludwigshafen am Rhein (DE)

( * ) Notice: Subject to any disclaimer, the term of this patent is extended or adjusted under 35 U.S.C. 154(b) by 103 days.

(21) Appl. No.: 15/518,945

(22) PCT Filed: Oct. 15, 2015

(86) PCT No.: PCT/CN2015/091979
§ 371 (c)(1),
(2) Date: Apr. 13, 2017

(87) PCT Pub. No.: WO2016/058541
PCT Pub. Date: Apr. 21, 2016

(65) Prior Publication Data
US 2017/0225959 A1     Aug. 10, 2017

(30) Foreign Application Priority Data
Oct. 15, 2014 (WO) ................ PCT/CN2014/088647

(51) Int. Cl.
| | |
|---|---|
| *B01J 29/70* | (2006.01) |
| *C01B 39/48* | (2006.01) |
| *B01J 29/18* | (2006.01) |
| *C01B 39/20* | (2006.01) |
| *C01B 39/26* | (2006.01) |
| *C01B 39/04* | (2006.01) |
| *B01J 29/08* | (2006.01) |
| *B01J 29/40* | (2006.01) |
| *B01J 29/65* | (2006.01) |
| *C01B 37/02* | (2006.01) |
| *C01B 39/08* | (2006.01) |
| *C01B 39/40* | (2006.01) |

(52) U.S. Cl.
CPC .............. *C01B 39/48* (2013.01); *B01J 29/08* (2013.01); *B01J 29/18* (2013.01); *B01J 29/40* (2013.01); *B01J 29/65* (2013.01); *B01J 29/70* (2013.01); *B01J 29/7007* (2013.01); *B01J 29/7023* (2013.01); *B01J 29/7038* (2013.01); *B01J 29/7042* (2013.01); *C01B 37/02* (2013.01); *C01B 39/04* (2013.01); *C01B 39/08* (2013.01); *C01B 39/087* (2013.01); *C01B 39/205* (2013.01); *C01B 39/265* (2013.01); *C01B 39/40* (2013.01); *C01P 2002/72* (2013.01); *C01P 2002/86* (2013.01)

(58) Field of Classification Search
CPC ......... C01B 39/04; C01B 39/40; C01B 39/48; C01B 39/205; C01B 39/265; B01J 37/08; B01J 37/10; B01J 29/40; B01J 29/7007; B01J 29/08; B01J 29/18; B01J 29/65; B01J 29/70; B01J 29/7023; B01J 29/7038; B01J 29/7042; C01P 2002/86
See application file for complete search history.

(56) References Cited

U.S. PATENT DOCUMENTS

| | | | |
|---|---|---|---|
| 8,226,925 B2 | 7/2012 | Corma Canos et al. | |
| 9,656,251 B2 * | 5/2017 | Shu ........................ | B01J 29/40 |
| 2014/0113981 A1 | 4/2014 | Yilmaz et al. | |
| 2015/0090226 A1 | 4/2015 | Dolan et al. | |
| 2015/0090231 A1 | 4/2015 | Dolan et al. | |
| 2015/0090344 A1 | 4/2015 | Dolan et al. | |
| 2015/0090611 A1 | 4/2015 | Dolan et al. | |
| 2015/0119569 A1 | 4/2015 | Shu et al. | |
| 2015/0284255 A1 | 10/2015 | Maurer et al. | |
| 2015/0298983 A1 | 10/2015 | Maurer et al. | |
| 2015/0329368 A1 | 11/2015 | Parvulescu et al. | |
| 2017/0225959 A1 | 8/2017 | Maurer et al. | |

FOREIGN PATENT DOCUMENTS

| | | |
|---|---|---|
| CN | 1483671 A | 3/2004 |
| CN | 102627287 A | 8/2012 |
| | (Continued) | |

OTHER PUBLICATIONS

U.S. Appl. No. 61/715,360.
(Continued)

*Primary Examiner* — David M Brunsman
(74) *Attorney, Agent, or Firm* — Drinker Biddle & Reath LLP

(57) ABSTRACT

The present invention relates to a process for the preparation of a zeolitic material comprising $YO_2$ in its framework structure, wherein Y stands for a tetravalent element, wherein said process comprises the steps of:
(1) providing a mixture comprising one or more sources for $YO_2$, one or more fluoride containing compounds, and one or more structure directing agents;
(2) crystallizing the mixture obtained in step (1) for obtaining a zeolitic material comprising $YO_2$ in its framework structure;

wherein the mixture provided in step (1) and crystallized in step (2) contains 35 wt.-% or less of $H_2O$ based on 100 wt.-% of $YO_2$ contained in the mixture provided in step (1) and crystallized in step (2), as well as to a zeolitic material comprising $YO_2$ in its framework structure obtainable and/or obtained according to said process, and to a zeolitic material per se comprising $SiO_2$ in its framework structure, wherein in the $^{29}Si$ MAS NMR spectrum of the as-synthesized zeolitic material the ratio of the total integration value of the peaks associated to Q3 signals to the total integration value of the peaks associated to Q4 signals is in the range of from 0:100 to 20:80, including the use of the aforementioned zeolitic materials.

13 Claims, 12 Drawing Sheets

(56) References Cited

FOREIGN PATENT DOCUMENTS

| | | |
|---|---|---|
| CN | 102992343 A | 3/2013 |
| CN | 103121698 A | 5/2013 |
| CN | 103979574 A | 8/2014 |
| CN | 104556087 A | 4/2015 |
| CN | 104891520 A | 9/2015 |
| DE | 4407872 A1 | 2/1996 |
| EP | 2119669 A1 | 11/2009 |
| WO | WO-2008058398 A1 | 5/2008 |
| WO | WO-2011158218 A1 | 12/2011 |

OTHER PUBLICATIONS

U.S. Appl. No. 61/883,669.
U.S. Appl. No. 61/990,490.
U.S. Appl. No. 61/990,756.
U.S. Appl. No. 61/990,773.
U.S. Appl. No. 61/883,704.
U.S. Appl. No. 61/715,356.
Deforth, U., et al., "Dry synthesis of B-MFI, MTN- and MTW-type materials", Microporous Materials, 1997, vol. 9, No. 5-6, pp. 287-290.
Yang, X., et al., "Solvothermal synthesis of germanosilicate-sodalite and silica-sodalite: Effects of water, germanium and fluoride", Microporuous and Mesoporous Materials, 2007, vol. 100, No. 13, pp. 95-102.
International Search Report for PCT/CN2015/091979 dated Jan. 15, 2016.
Jin, Y., "Solvent-free Synthesis of Aluminophosphate Zeolites and Its Application", Master's Dissertation, Institute of Catalysis, Department of Chemistry, Zhejiang University, Hangzhou, Peoples Republic of China, Jan. 2014.
Jin, Y., et al., "Solvent-free Synthesis of Silicoaluminophosphate Zeolites", Angewandte Chemie International Edition, vol. 52, No. 35, (2013), pp. 9172-9175.
Morris, R., et al., "Solventless Synthesis of Zeolites", Angewandte Chemie International Edition, vol. 52, No. 8, (2013), pp. 2163-2165.
Ren, L., et al., "Solvent-free Synthesis of Zeolites from Solid Raw Materials", Journal of the American Chemical Society, vol. 134, No. 37, (2012), pp. 15173-15176.
Written Opinion of the International Searching Authority for PCT/CN2015/091979 dated Jan. 15, 2016.
Wu, Q., et al., "Sustainable Synthesis of Zeolites without Addition of Both Organotemplates and Solvents", Journal of the American Chemical Society, vol. 136, No. 10, (2014), pp. 4019-4025.

* cited by examiner

SOLIDOTHERMAL SYNTHESIS OF ZEOLITIC MATERIALS AND ZEOLITES OBTAINED THEREFROM

CROSS-REFERENCE TO RELATED APPLICATIONS

This application is a national stage application (under 35 U.S.C. § 371) of PCT/CN2015/091979, filed Oct. 15, 2015, which claims benefit of Chinese Application No. PCT/CN2014/088647, filed Oct. 15, 2014, both of which are incorporated herein by reference in their entirety.

TECHNICAL FIELD

The present invention relates to a process for the preparation of a zeolitic material comprising $YO_2$ in its framework structure, wherein Y stands for a tetravalent element, wherein said process involves the solidothermal crystallization of a mixture containing 35 wt.-% or less of $H_2O$ based on 100 wt.-% of $YO_2$ contained therein as well as to zeolitic materials obtained and/or obtainable according to said process. Furthermore, the present invention relates to an as-synthesized zeolitic material comprising $SiO_2$ in its framework structure which is characterized by the specific relative intensities of Q3 and Q4 signals contained in its $^{29}Si$ MAS NMR spectrum as may for example be achieved by the aforementioned solidothermal synthesis according to the present invention. Finally, the present invention relates to the use of the inventive material in particular applications.

INTRODUCTION

Zeolites, a family of crystalline aluminosilicates, are widely used as catalysts in the industrial processes of oil refining and production of fine chemicals due to their high surface area, large pore volume, uniform microporous channels, and excellent thermal and hydrothermal stabilities. Initially, zeolites such as those having the LTA, FAU, BEA, and MFI framework structure were synthesized in alkaline media. It was later discovered that using fluoride various types of zeolites, and especially silica-rich zeolites and all-silica zeolites such as those having the MFI, FER, BEA, LTA, TON, and EUO framework structure could be synthesized. These syntheses require the presence of solvents such as water, alcohols, and/or ionic liquids and are accordingly conducted under hydrothermal, solvothermal, or ionothermal conditions. Recently, Ren et al. in *J. Am. Chem. Soc.* 2012, 134, 15173-15176 and Jin et al. in *Angew. Chem. Int. Ed.* 2013, 52, 9172-9175 reported the solvent-free synthesis of aluminosilicate and aluminophosphate-based zeolites, emphasizing the advantages linked thereto such as increasing zeolite yield, reducing water pollution, and eliminating high pressure conditions encountered in conventional synthetic methodologies. The importance of solvent-free synthetic methodologies has also been high-lighted by Morris et al. in *Angew. Chem. Int. Ed.* 2013, 52, 2163-2165.

Wu et al. in *J. Am. Chem. Soc.* 2014, 136, 4019-4025 relates to the solvent-free synthesis of zeolites in the absence of organotemplates, and in particular of ZSM-5 and Beta zeolite.

Compared with the conventional synthesis, the solidothermal synthesis not only has all advantages associated with solvent-free synthesis, but also uses minimal organic templates. Taking all of the these advantages into account, it is believable that the methodology of solidothermal synthesis opens a new door for synthesizing zeolites and will be of great importance for industrial production in the near future.

Although progress has been made relative to developing methods for the synthesis of zeolites in the absence of a solvent and in particular in the absence of water, the methods nevertheless still employ substantial amounts of solvent and in particular of water in the form of crystallization water contained in the starting materials based on the amount of the solid materials present in the reaction mixtures. The need therefore remains for the development of synthetic procedures for the preparation of zeolitic materials which may be preformed with yet lower amounts of solvent and in particular of water if not in the total absence thereof. Furthermore, there remains a need for providing novel zeolitic materials displaying unprecedented physical and chemical properties for use as molecular sieves, as adsorbents, and for ion exchange, not to mention the constant need for new catalyst and/or catalyst supports based on such zeolitic materials.

DETAILED DESCRIPTION

It was therefore the object of the present invention to provide a process for the preparation of zeolitic materials which may be performed in the presence of only very little amounts of water or even in the total absence of any solvent. Furthermore, it was the object of the present invention to provide novel zeolitic materials displaying unique physical and chemical properties in view of a novel synthetic procedure for their preparation which may be performed in the absence of a solvent and in particular of water. Thus, it has surprisingly been found that by performing the synthesis of zeolitic materials in the presence of one or more fluoride containing compounds and one or more structure directing agents, it is possible to crystallize a zeolitic material in the presence of very minute amounts of water and even in the total absence of water or any other solvent in the reaction mixture via solidothermal synthesis. Furthermore, it has quite unexpectedly been found that zeolitic materials may be obtained according to the aforementioned solidothermal synthesis displaying unprecedented physical and chemical properties in particular due to the particularly low amount of structural defects and/or irregularities in their framework structure. More specifically, it has quite surprisingly been found that by producing zeolitic materials in the absence of water, the $YO_4$-tetrahedra which form the basic framework structure of the zeolitic material bind to each other in such a manner that practically all of the corners of the tetrahedra are linked to further tetrahedra such that deficiencies in the crystal structure are minimized.

Therefore, the present invention relates to a process for the preparation of a zeolitic material comprising $YO_2$ in its framework structure, wherein Y stands for a tetravalent element, wherein said process comprises the steps of:

(1) providing a mixture comprising one or more sources for $YO_2$, one or more fluoride containing compounds, and one or more structure directing agents;

(2) crystallizing the mixture obtained in step (1) for obtaining a zeolitic material comprising $YO_2$ in its framework structure;

wherein the mixture provided in step (1) and crystallized in step (2) contains 35 wt.-% or less of $H_2O$ based on 100 wt.-% of $YO_2$ contained in the mixture provided in step (1) and crystallized in step (2).

According to the present invention, the mixture provided in step (1) and crystallized in step (2) contains 35 wt.-% or less of $H_2O$ based on 100 wt.-% $YO_2$. Thus, there is no particular restriction relative to the amount of $H_2O$ contained in the mixture provided in step (1) and crystallized in step (2) provided that it does not exceed the amount of 35 wt.-% or less of $H_2O$ based on 100 wt.-% of $YO_2$. Thus, by way of example, the mixture provided in step (1) and crystallized in step (2) may contain 30 wt.-% or less of $H_2O$ based on 100 wt.-% of $YO_2$ contained in the mixture provided in step (1) and crystallized in step (2), wherein preferably the mixture contains 25 wt.-% or less of $H_2O$, more preferably 20 wt.-% or less, more preferably 25 wt.-% or less, more preferably 10 wt.-% or less, more preferably 5 wt.-% or less, more preferably 3 wt.-% or less, more preferably 1 wt.-% or less, more preferably 0.5 wt.-% or less, more preferably 0.1 wt.-% or less, and more preferably 0.05 wt.-% or less. According to the inventive process it is however particularly preferred that the mixture provided in step (1) and crystallized in step (2) contains 0.01 wt.-% or less of $H_2O$ based on 100 wt.-% of $YO_2$ contained in the mixture provided in step (1) and crystallized in step (2).

As regards the zeolitic material crystallized in step (2), no particular restriction applies relative to the framework structure which it may display provided that the zeolitic material comprises $YO_2$ in its framework structure. Thus, by way of example, the framework structure of the zeolitic material crystallized in step (2) may be selected from the group consisting of BEA, BEC, CHA, EUO, FAU, FER, HEU, ITH, ITW, LEV, MEL, MFI, MOR, MTN, MWW, and TON, including mixed structures of two or more thereof. According to the inventive process it is however preferred that the zeolitic material crystallized in step (2) has a framework structure selected from the group consisting of BEA, BEC, CHA, EUO, FAU, FER, ITH, ITW, LEV, MFI, MOR, MTN, MWW, and TON, including mixed structures of two or more thereof, and more preferably from the group consisting of BEA, BEC, EUO, ITH, ITW, MFI, MTN, and TON, including mixed structures of two or more thereof. According to the inventive process it is however particularly preferred that the zeolitic material crystallized in step (2) has a framework structure selected from the group consisting of BEA, EUO, MFI, MTN, and TON, including mixed structures of two or more thereof. According to the inventive process it is however alternatively particularly preferred that the zeolitic material crystallized in step (2) has a framework structure selected from the group consisting of BEC, ITH, and ITW, including mixed structures of two or more thereof.

Regarding the tetravalent element Y contained in the framework structure of the zeolitic material prepared according to the inventive process, no particular restriction applies such that in principle any suitable tetravalent element Y may be employed in the inventive process provided that a zeolitic material comprising said tetravalent element Y as $YO_2$ is contained in its framework structure. According to the inventive process it is however preferred that Y is selected from the group consisting of Si, Sn, Ti, Zr, Ge, and mixtures of two or more thereof, wherein it is preferred that Y comprises Si. According to the inventive process it is however particularly, preferred that the tetravalent element Y is Si such that a zeolitic material comprising $SiO_2$ in its framework structure is prepared according to the inventive process.

Concerning the one or more sources for $YO_2$ provided in step (1) of the inventive process, no particular restrictions apply such that any suitable source or mixture of sources may be employed. According to preferred embodiments of the inventive process and in particular embodiments of the present invention wherein the tetravalent element Y comprises Si and in particular according to particularly preferred embodiments wherein the tetravalent element Y is Si, one or more sources of $SiO_2$ are accordingly provided in step (1). As regards the one or more sources of $SiO_2$ which may be provided in step (1) according to said preferred embodiments, no particular restrictions apply such that in principle any suitable one or more sources of $SiO_2$ may be provided therein, provided that a zeolitic material comprising $SiO_2$ in its framework structure may be obtained. Thus, by way of example, the one or more sources of $YO_2$ and in particular of $SiO_2$ provided in step (1) of the inventive process may be selected from the group consisting of silicas, silicates, silicic acid, and combinations of two or more thereof. According to the inventive process it is however preferred that the one or more sources of $YO_2$ and in particular of $SiO_2$ provided in step (1) is selected from the group consisting of silicas, alkali metal silicates, silicic acid, and combinations of two or more thereof, wherein more preferably the one or more sources of $YO_2$ and in particular of $SiO_2$ is selected from the group consisting of fumed silica, colloidal silica, reactive amorphous solid silica, silica gel, pyrogenic silica, lithium silicates, sodium silicates, potassium silicates, silicic acid, and combinations of two or more thereof, and more preferably from the group consisting of fumed silica, silica gel, pyrogenic silica, sodium silicates, silicic acid, and combinations of two or more thereof, wherein more preferably the one or more sources of $YO_2$ and in particular of $SiO_2$ are selected from the group consisting of fumed silica, silica gel, pyrogenic silica, and combinations of two or more thereof. According to the inventive process it is particularly preferred that the one or more sources of $YO_2$ and in particular of $SiO_2$ provided in step (1) comprises fumed and/or pyrogenic silica, and preferably fumed silica, wherein it is particularly preferred that the one or more sources for $YO_2$ is fumed and/or pyrogenic silica, and is preferably fumed silica.

As regards the one or more fluoride containing compounds provided in step (1) of the inventive process, no particular restrictions apply neither with respect to the type of the one or more fluoride containing compounds which may be employed, nor with respect to the number of different fluoride containing compounds which may be used provided that a zeolitic material comprising $YO_2$ in its framework structure may be crystallized in step (2) of the inventive process. Thus, by way of example, the one or more fluoride containing compounds may comprise one or more fluoride salts and/or hydrogen fluoride, wherein preferably the one or more fluoride containing compounds comprise hydrogen fluoride and/or one or more fluoride salts selected from the group consisting of ammonium fluoride, metal fluorides, organic fluoride salts, and mixtures of two or more thereof, more preferably from the group consisting of ammonium fluoride, metal fluorides, organic fluoride salts, and mixtures of two or more thereof, more preferably from the group consisting of ammonium fluoride, alkali metal fluorides, alkaline earth metal fluorides, alkylammonium fluorides, and mixtures of two or more thereof, more preferably from the group consisting of ammonium fluoride, alkali metal fluorides, mono($C_1$-$C_4$)alkylammonium fluorides, di($C_1$-$C_4$)alkylammonium fluorides, tri($C_1$-$C_4$)alkylammonium fluorides, tetra($C_1$-$C_4$)alkylammonium fluorides, and mixtures of two or more thereof, more preferably from the group consisting of ammonium fluoride, lithium fluoride, sodium fluoride, potassium fluoride, rubidium fluoride, cesium fluoride, mono($C_1$-$C_3$)alkylammonium fluorides, di($C_1$-$C_3$)alkylammonium fluorides, tri($C_1$-$C_3$)alkylammonium fluorides, tetra($C_1$-$C_3$)alkylammonium fluorides, and mixtures of two or more thereof, more preferably from the group consisting of ammonium fluoride, lithium fluoride, sodium fluoride, potassium fluoride, mono($C_1$-$C_2$)alkylammonium fluorides, di($C_1$-$C_2$)alkylammonium fluorides, tri($C_1$-$C_2$)alkylammonium fluorides, tetra($C_1$-$C_2$)alkylammonium fluorides, and mixtures of two or more thereof. According to the inventive process it is further preferred that the one or more fluoride containing compounds comprise one or more selected from the group consisting of ammonium fluoride, hydrogen fluoride, sodium fluoride, potassium fluoride, and mixtures of two or more thereof, wherein more preferably the one or more fluoride containing compounds comprise ammonium fluoride and/or hydrogen fluoride, and preferably comprise ammonium fluoride. According to the present invention it is however particularly preferred that ammonium fluoride is employed as the one or more fluoride containing compounds in the mixture provided in step (1) and crystallized in step (2). It is, however, alternatively preferred according to the inventive process that the one or more fluoride containing compounds comprise ammonium hydrogen difluoride wherein more preferably ammonium hydrogen difluoride is employed as the one or more fluoride containing compounds in the mixture provided in step (1) and crystallized in step (2).

Regarding the one or more structure directing agents provided in step (1) of the inventive process, no particular restrictions apply provided that a zeolitic material comprising $YO_2$ in its framework structure may be crystallized in step (2). According to the present invention it is however preferred that the one or more structure directing agents provided in step (1) comprise one or more organic compounds and preferably one or more organic compounds selected from the group consisting of alkanes and derivatives thereof, amines, ammonium salts, imidazolinium salts, and mixtures of two or more thereof. Thus, in principle, no particular restrictions apply as to the one or more structure directing agents such that any suitable one or more structure directing agents may be employed among the structure directing agents and in particular the organic compounds which are used in the art for the production of zeolitic materials provided that their use in the inventive process allows for the preparation of a zeolitic material comprising $YO_2$ in its framework structure. Thus, by way of example, one or more organic compounds and in particular one or more organic compounds selected from the group consisting of alkanes and derivatives thereof, amines, ammonium salts, and mixtures of two or more thereof may be comprised among the one or more structure directing agents employed in the inventive process without however limiting the one or more structure directing agents which may be employed therein to the aforementioned compounds and mixtures thereof. Accordingly, by further way of example, the one or more organic compounds preferably comprised among the one or more structure directing agents provided in step (1) may further be selected from the group consisting of tetraalkylammonium salts, alkenyltrialkylammonium salts, aryltrialkylammonium salts, dialkyldiarylammonium salts, heterocyclic amines, heterocyclic ammonium salts, adamantylammonium salts, alkylenediammonium salts, N-alkyl-trialkyleneammonium salts, N,N-diaryl-trialkyleneammonium salts, alkylamines, cycloalkylammonium salts, dialkylammonium salts, quinuclidine and derivatives thereof, quinuclidinium salts, norbornane and derivatives thereof, trialkylenediamines, trialkylimidazolinium salts, and mixtures of two or more thereof, more preferably from the group consisting of tetramethylammonium salts, trimethylethylammonium salts, dimethyldiethylammonium salts, methyltriethylammonium salts, tetraethylammonium salts, triethylpropylammonium salts, diethyldipropylammonium salts, ethyltripropylammonium salts, tetrapropylammonium salts, trimethylpropylammonium salts, dimethyldipropylammonium salts, methyltripropylammonium salts, N-(2-propen-1-yl)-tri-n-propylammonium salts, N-(1-propen-1-yl)-tri-n-propylammonium salts, N-(1-propen-2-yl)-tri-n-propylammonium salts, N,N,N-tri($C_1$-$C_3$)alkylbenzylammonium salts, N,N,N-di($C_1$-$C_3$)alkyldibenzylammonium salts, ($C_4$-$C_6$)heterocyclic amines, ($C_4$-$C_6$)heterocyclic ammonium salts, N,N,N-($C_1$-$C_3$)trialkyl-adamantylammonium salts, N,N,N,N,N,N-hexa($C_1$-$C_3$)alkyl-($C_3$-$C_7$)alkylenediammonium salts, N,N-di($C_1$-$C_3$)alkyl-tri($C_1$-$C_3$)alkyleneammonium salts, N,N-diaryl-tri($C_1$-$C_3$)alkylenediammonium salts, tri($C_1$-$C_3$)alkylamines, di($C_1$-$C_3$)alkyl($C_5$-$C_7$)cycloalkylamines, ($C_1$-$C_3$)alkyl($C_5$-$C_7$)dicycloalkylamines, ($C_3$-$C_7$)alkylenediamines, N,N,N,N-tetra($C_1$-$C_2$)alkyl($C_3$-$C_7$)alkylenediamines, N,N,N-tri($C_1$-$C_2$)alkyl($C_5$-$C_7$)cycloalkylammonium salts, azonio-bicyclo($C_6$-$C_{10}$)alkanes, quinuclidinol and derivatives thereof, N—($C_1$-$C_3$)alkylquinuclidinium salts, aminonorbornanes and derivatives thereof, tri($C_1$-$C_3$)alkylenediamines, tri($C_1$-$C_3$)alkylimidazolinium salts, and mixtures of two or more thereof, more preferably from the group consisting of tetramethylammonium salts, dimethyldiethylammonium salts, tetraethylammonium salts, diethyldipropylammonium salts, tetrapropylammonium salts, dimethyldipropylammonium salts, N-(2-propen-1-yl)-tri-n-propylammonium, N-(1-propen-1-yl)-tri-n-propylammonium salts, N,N,N-triethylbenzylammonium salts, N,N,N-ethyldimethylbenzylammonium salts, N,N,N-diethylmethylbenzylammonium salts, N,N,N-diethyldibenzylammonium salts, N,N,N-trimethylbenzylammonium salts, N,N,N-dimethyldibenzylammonium salts, N,N,N-dimethyldibenzylammonium salts, N,N,N-ethylmethyldibenzylammonium salts, N,N,N-diethyldibenzylammonium salts, N,N,N-ethylpropyldibenzylammonium salts, N,N,N-methylpropyldibenzylammonium salts, N,N,N-dipropyldibenzylammonium salts, ($C_5$-$C_6$)heterocylcic amines, N,N-($C_1$-$C_3$)dialkyl-imidazolinium salts, N,N-di($C_1$-$C_3$)alkylpiperidinium salts, N,N,N($C_1$-$C_2$)trialkyl-adarnantylammonium salts, N,N,N,N,N,N-hexa($C_1$-$C_2$)alkyl-($C_5$-$C_7$)alkylenediammonium salts, N,N-di($C_1$-$C_2$)alkyl-tri($C_1$-$C_2$)alkyleneammonium salts, N,N-dibenzyl-tri($C_1$-$C_2$)alkylenediammonium salts, ($C_5$-$C_6$)cycloalkylamines, tri($C_1$-$C_2$)alkylamines, di($C_1$-$C_2$)alkyl($C_5$-$C_6$)cycloalkylamines, ($C_1$-$C_2$)alkyl($C_5$-$C_6$)dicycloalkylamines, ($C_4$-$C_6$)alkylenediamines, N,N,N,N-tetra($C_1$-$C_2$)alkyl($C_4$-$C_6$)alkylenediamines, N,N,N-tri($C_1$-$C_2$)alkyl($C_5$-$C_6$)cycloalkylammonium salts, azonio-bicyclo($C_7$-$C_9$)alkanes, 3-quinuclidinol and derivatives thereof, N—($C_1$-$C_2$)alkylquinuclidinium salts, aminonorbornanes and derivatives thereof, tri($C_1$-$C_2$)alkylenediamines, 1,2,3-tri($C_1$-$C_2$)alkylimidazolinium salts, and mixtures of two or more thereof, and more preferably from the group consisting of tetrapropylammonium salts, tetraethylammonium salts, diethyldimethylammonium salts, N-(2-propen-1-yl)-tri-n-propylammonium salts, N,N,N-trimethylbenzylammonium salts, N,N,N-dibenzyldimethylammonium salts, hexamethyleneimine, 1-ethyl-3-methylimidazolium salts, N,N-dimethyl-3,3-dimethylpiperidinium salts, N,N-methylethyl-3,3-dimethylpiperidinium salts, N,N-dimethyl-2-methylpiperidinium salts, N,N,N-trimethyl-1-adamantylammonium salts, N,N,N-trimethyl-2-adamantylammonium salts, hexamethonium salts, 1-methyl-1-azonia-4-azabicyclo[2.2.2]octane, 1,4-dibenzyl-1,4-diazoniabicyclo[2.2.2]octane, cyclohexylamine, N,N- dimethylcyclohexylamine, N,N,N-timethylcyclohexylammonium salts, 1,3,3,6,6-pentamethyl-6-azonio-bicyclo [3.2.1]octane, N-alkyl-3-quinuclidinol, N-methylquinuclidinium salts, N,N,N-trialkyl-exoaminonorbornane, triethylenediamine, and mixtures of two or more thereof. According to the inventive process it is further preferred that the one or more structure directing agents provided in step (1) comprise one or more organic compounds selected from the group consisting of tetrapropylammonium salts, tetraethylammonium salts, hexamethonium salts, 1-ethyl-3-methylimidazolium salts, triethylenediamine, and mixtures of two or more thereof. According to the inventive process it is however particularly preferred that one or more organic compounds selected from the group consisting of tetrapropylammonium salts, tetraethylammonium salts, hexamethonium salts, 1-ethyl-3-methylimidazolium salts, triethylenediamine, 1,2,3-trimethylimidazolinium salts, and mixtures of two or more thereof are provided as the one or more structure directing agents in step (1) of the inventive process.

As regards the organic salts and in particular the ammonium salts preferably comprised among the one or more structure directing agents provided in step (1) according to any of the particular and preferred embodiments defined in the present application, no particular restriction applies relative to the anion or anions of said salts provided that a zeolitic material comprising $YO_2$ in its framework structure may be obtained upon crystallization of the mixture obtained in step (1) and step (2) of the inventive process. Thus, by way of example, the anion of the organic salts and in particular of the ammonium salts according to any of the particular and preferred embodiments of the inventive process may be selected from the group consisting of hydroxide, halides, nitrate, nitrite, sulfates, sulfite, phosphates, phosphites, cyanide, and combinations of two or more thereof. According to the inventive process it is however preferred that the anion of the organic salts and in particular the ammonium salts preferably comprised among the one or more structure directing agents provided in step (1) of the inventive process is selected from the group consisting of hydroxide, fluoride, chloride, bromide, iodide, nitrate, sulfate, hydrogensulfate, dihydrogensulfate, cyanide, and combinations of two or more thereof, more preferably from the group consisting of hydroxide, chloride, bromide, iodide, nitrate, and combinations of two or more thereof, and more preferably from the group consisting of chloride, bromide, iodide, and combinations of two or three thereof. According to the present invention it is particularly preferred that the anion of the one or more organic salts and in particular the one or more ammonium salts preferably comprised in the one or more structure directing agents provided in step (1) according to any of the particular and preferred embodiments as defined in the present application is iodide and/or bromide, and is preferably bromide.

According to the present invention, no particular restriction applies relative to the amount in which the one or more structure directing agents may be employed in the inventive process provided that a zeolitic material comprising $YO_2$ in its framework structure may be crystallized in step (2) from the mixture obtained in step (1). Thus, by way of example, the molar ratio of the one or more structure directing agents:$YO_2$ in the mixture provided in step (1) and crystallized in step (2) may range anywhere from 0.01 to 2, wherein preferably the molar ratio of the one or more structure directing agents:$YO_2$ is comprised in the range of from 0.03 to 1, and more preferably of from 0.05 to 0.5, more preferably of from 0.07 to 0.3, and more preferably from 0.1 to 0.25. According to the inventive process it is particularly preferred that the molar ratio of the one or more structure directing agents:$YO_2$ in the mixture provided in step (1) and crystallized in step (2) is comprised in the range of from 0.15 to 0.2.

Concerning the amount in which the one or more fluoride containing compounds may be employed in the inventive process, same applies accordingly as for the one or more structure directing agents such that in principle any conceivable amount may be employed provided that a zeolitic material comprising $YO_2$ in its framework structure may be prepared according to the inventive process. Thus, by way of example, the molar ratio of fluoride $YO_2$ in the mixture provided in step (1) and crystallized in step (2) may be comprised in the range of from 0.01 to 5, wherein preferably the fluoride:$YO_2$ molar ratio is comprised in the range of from 0.05 to 3 and more preferably of from 0.1 to 2, more preferably of from 0.15 to 1.5, and more preferably of from 0.25 to 1.25. According to the inventive process it is particularly preferred that the molar ratio of fluoride $YO_2$ in the mixture provided in step (1) and crystallized in step (2) is comprised in the range of from 0.5 to 1.0.

According to the present invention, one or more further components may be provided to the mixture in step (1) in addition to the one or more sources of $YO_2$, one or more fluoride containing compounds, and one or more structure directing agents. In this respect, no particular restriction applies neither with respect to the type and/or number of the further components which may be provided to the mixture in step (1), nor with respect to their respective amounts provided that again a zeolitic material comprising $YO_2$ in its framework structure may be crystallized in step (2) thereof. According to the inventive process it is however particularly preferred that seed crystals are further provided in step (1). Concerning the amount in which seed crystals may be further provided in step (1), again, no particular restrictions apply provided that a zeolitic material comprising $YO_2$ in its framework structure may be crystallized in step (2). Thus, by way of example, seed crystals may further be provided in step (1) in an amount ranging from 0.1 to 20 wt.-% based on 100 wt.-% of $YO_2$ contained in the mixture provided in step (1) and crystallized in step (2), wherein preferably the amount of seed crystals which may be further provided is comprised in the range of from 0.3 to 15 wt.-%, and more preferably of from 0.5 to 12 wt.-%, more preferably of from 1 to 10 wt.-%, and more preferably of from 2 to 8 wt.-%. According to the inventive process it is particularly preferred that seed crystals are further provided in step (1) in an amount comprised in the range of from 5 to 7 wt.-% based on 100 wt.-% of $YO_2$ contained in the mixture provided in step (1) and crystallized in step (2).

As regards the type of seed crystals which may be employed in the inventive process, no particular restrictions apply such that any conceivable material may be employed as seed crystals provided that a zeolitic material comprising $YO_2$ in its framework structure may be crystallized in step (2) of the inventive process. It is, however, preferred according to the present invention that the seed crystals comprise one or more zeolitic materials, and preferably comprise one or more zeolitic materials having the framework structure of the zeolitic material comprised in $YO_2$ obtained according to any of the particular and preferred embodiments of the inventive process as defined in the present application. Thus, as noted above, there is no particular restriction as to the framework structure of the zeolitic material which may be obtained according to the inventive process such that there is accordingly no particular restriction as to the framework structure of the zeolitic materials which may be comprised among the seed crystals preferably employed in the inventive process. According to the present invention it is however preferred that the seed crystals comprise one or more zeolitic materials having a framework structure selected from the group consisting of BEA, CHA, EUO, FAU, FER, HEU, ITH, LEV, MEL, MFI, MOR, MTN, MWW, and TON, including mixed structures of two or more thereof, wherein more preferably the seed crystals comprise one or more zeolitic materials having a framework structure selected from the group consisting of BEA, CHA, EUO, FAU, FER, ITH, LEV, MFI, MOR, MTN, MWW, and TON, including mixed structures of two or more thereof, and more preferably from the group consisting of BEA, EUO, ITH, including mixed structures of two or three thereof. According to the inventive process it is however particularly preferred that the one or more zeolitic materials comprised in the seed crystals have the BEA and/or EUO framework structure, wherein even more preferably the one or more zeolitic materials having the BEA and/or EUO framework structure are provided in step (1) of the inventive process as seed crystals. It is however alternatively particularly preferred according to the inventive process that the one or more zeolitic materials comprised in the seed crystals have the ITH framework structure, wherein even more preferably the one or more zeolitic materials having the ITH framework structure are provided in step (1) of the inventive process as seed crystals.

It is, however, preferred according to the inventive process that the zeolitic material which is obtained according to any of the particular and preferred embodiments of the inventive process as defined in the present application is comprised among the seed crystals preferably provided in step (1) of the inventive process wherein preferably the zeolitic material which is obtained and/or which is obtainable according to any one of the particular and preferred embodiments of the inventive process as defined in the present application is provided in step (1) as seed crystals for the preparation of a zeolitic material comprising $YO_2$ in its framework structure.

Further regarding the additional components which may be provided in step (1) of the inventive process in addition to the one or more sources of $YO_2$, one or more fluoride containing compounds, one or more structure directing agents, and in addition to the optional seed crystals, one or more sources of $X_2O_3$ may be further provided in step (1), wherein X stands for a trivalent element. According to said preferred embodiments of the present invention, it is further preferred that a zeolitic material comprising $YO_2$ and $X_2O_3$ in its framework structure is obtained from the crystallization of the mixture obtained in step (1) in step (2). With respect to the trivalent element X which may be employed in the inventive process, no particular restriction applies such that in principle any suitable trivalent element X may be employed provided that a zeolitic material comprising $YO_2$ in its framework structure may be obtained from crystallization in step (2) and preferably provided that a zeolitic material comprising $YO_2$ and $X_2O_3$ in its framework structure may be obtained from crystallization in step (2). Thus, by way of example, X may be selected from the group consisting of Al, B, In, Ga, Fe, and combinations of two or more thereof, wherein preferably X is selected from the group consisting of Al, B, Fe, and combinations of two or more thereof. According to the inventive process it is particularly preferred that X is Fe and/or B, wherein more preferably X is B.

Furthermore, in addition to or alternatively to the one or more sources of $X_2O_3$ which may be further provided in step (1), one or more sources of $Z_2O_5$ may be further provided in step (1) in addition to the one or more sources for $YO_2$, one or more fluoride containing compounds, one or more structure directing agents, optional seed crystals, and optional $X_2O_3$, wherein Z stands for a pentavalent element. As for Y and X, any suitable pentavalent element Z may be employed in the inventive process provided that a zeolitic material comprising $YO_2$ in its framework structure may be obtained from crystallization in step (2) of the inventive process, wherein it is preferred that the pentavalent element Z is chosen such that a zeolitic material comprising $YO_2$ and $Z_2O_5$ in its framework structure may be obtained from crystallization of the mixture obtained in step (1) in step (2). Thus, by way of example, Z may be selected from the group consisting of P, As, Sb, Bi, V, Nb, Ta, and combinations of two or more thereof, wherein Z is preferably selected from the group consisting of P, As, V, and combinations of two or more thereof. According to the inventive process it is particularly preferred that Z is P and/or As, wherein even preferably Z is P.

Although there is principally no limitation as to the components which may be provided to the mixture in step (1) in addition to the one or more sources of $YO_2$, one or more fluoride containing compounds, one or more structure directing agents, optional seed crystals, optional one or more sources for $X_2O_3$, and optional one or more sources for $Z_2O_5$, it is preferred that the mixture provided in step (1) and crystallized in step (2) does not contain more than a particular amount of specific elements. Thus, by way of example, it is preferred that the mixture provided in step (1) and crystalized in step (2) contains not more than a specific amount of alkali metals and in particular of sodium and/or potassium. More specifically, it is preferred according to the inventive process that the mixture provided in step (1) contains 5 wt.-% or less of Na and/or K, and preferably 5 wt.-% or less of Na, based on 100 wt.-% of $YO_2$ contained in the mixture provided in step (1) and crystallized in step (2), wherein more preferably the mixture provided in step (1) contains 3 wt.-% or less of Na and/or K, and preferably of Na, and more preferably 2 wt.-% or less, more preferably 1 wt.-% or less, more preferably 0.5 wt.-% or less, more preferably 0.1 wt.-% or less, more preferably 0.05 wt.-% or less, more preferably 0.01 wt.-% or less, and more preferably 0.005 wt.-% or less of Na and/or K, preferably of Na, based on 100 wt.-% of $YO_2$ contained in the mixture provided in step (1). According to the inventive process it is however particularly preferred that the mixture provided in step (1) and crystallized in step (2) contains 0.001 wt.-% or less of Na and/or K, and preferably of Na, based on 100 wt.-% of $YO_2$ contained in the mixture provided in step (1) and crystallized in step (2).

According to the present invention it is yet further preferred that the mixture provided in step (1) and crystallized in step (2) does not contain more than a specific amount of alkali metals and/or alkaline earth metals. In particular, it is further preferred that the mixture provided in step (1) and crystallized in step (2) contains 5 wt.-% or less of alkali metals and/or alkaline earth metals based on 100 wt.-% of $YO_2$ contained in the mixture provided in step (1) and crystallized in step (2), wherein more preferably said mixture contains 3 wt.-% or less of alkali metals and/or alkaline earth metals, and more preferably 2 wt-% or less, more preferably 1 wt.-% or less, more preferably 0.5 wt.-% or less, more preferably 0.1 wt.-% or less, more preferably 0.05 wt.-% or less, more preferably 0.01 wt.-% or less, and more preferably 0.005 wt.-% or less. According to the inventive process it is particularly preferred that the mixture provided in step (1) and crystallized in step (2) contains 0.001 wt.-% or less of alkali metals and/or alkaline earth metals based on 100 wt.-% of $YO_2$ contained in the mixture provided in step (1) and crystallized in step (2).

In addition to or alternatively to the preferred limitations concerning the amount of alkali metals and/or alkaline earth metals and in particular of sodium and/or potassium in the mixture provided in step (1) it is preferred that said mixture contains not more than specific amounts of phosphorus and/or of aluminum. In particular, it is further preferred that the mixture provided in step (1) and crystallized in step (2) contains 5 wt.-% or less of P and/or Al based on 100 wt.-% of $YO_2$ contained in the mixture provided in step (1) and crystallized in step (2). According to the inventive process it is yet further preferred that the mixture provided in step (1) contains 3 wt.-% or less of P and/or Al, and more preferably 2 wt.-% or less, more preferably 1 wt.-% or less, more preferably 0.5 wt.-% or less, more preferably 0.1 wt.-% or less, more preferably 0.05 wt.-% or less, more preferably 0.01 wt.-% or less, and more preferably 0.005 wt.-% or less of P and/or Al based on 100 wt.-% of $YO_2$ contained in the mixture provided in step (1). According to the inventive process it is particularly preferred that the mixture provided in step (1) contains 0.001 wt.-% or less of P and/or Al based on 100 wt.-% of $YO_2$ contained therein.

Concerning the conditions of crystallization which may be employed in step (2) for obtaining a zeolitic material comprising $YO_2$ in its framework structure, no particular restrictions apply in particular relative to the temperature and pressure of the crystallization process provided that the desired product may accordingly be obtained. According to the inventive process it may however be necessary to heat the mixture provided in step (2) for allowing the crystallization of a zeolitic material comprising $YO_2$ in its framework structure. As regards the temperature at which crystallization is preferably performed in step (2), no particular restrictions apply provided that the zeolitic material comprising $YO_2$ in its framework structure may be crystallized, such that, by way of example, crystallization in step (2) may involve heating of the mixture at a temperature ranging anywhere from 80 to 220° C. According to the inventive process it is however preferred that the crystallization in step (2) involves heating of the mixture at a temperature comprised in the range of from 100 to 200° C., and more preferably from 110 to 190° C. According to the present invention it is particularly preferred that crystallization in step (2) involves heating of the mixture at a temperature comprised in the range of from 120 to 180° C.

Concerning the pressure under which crystallization in step (2) may be performed, again no particular restriction applies provided that a zeolitic material comprising $YO_2$ in its framework structure may be obtained in step (2). Thus, by way of example, crystallization in step (2) may be preformed under ambient pressure such as in an open system or may be performed at pressures elevated relative to ambient pressure, in particular in instances wherein crystallization in step (2) involves heating of the mixture. Accordingly, crystallization in step (2) may be preformed in an open system for obtaining a zeolitic material comprising $YO_2$ in its framework structure such as Y zeolite, or may be crystallized at an elevated pressure relative to ambient pressure either by artificially increasing the pressure under which crystallization takes place and/or by creating pressure in the mixture crystallized in step (2) by means of chemical reaction and/or physical heating of the mixture. According to the inventive process it is accordingly preferred that in step (2) the mixture is crystallized under autogenous pressure. To this effect, crystallization in step (2) is preferably performed in a pressure-tight vessel, more preferably in an autoclave.

As regards the duration of the crystallization in step (2) of the inventive process, again no particular restriction applies provided that a zeolitic material comprising $YO_2$ in its framework structure may be obtained. In instances wherein the crystallization in step (2) involves the heating of the mixture, said heating may be preformed for a period ranging anywhere from 0.1 to 50 days, wherein preferably the mixture is heated for a period comprised in the range of from 0.3 to 30 days, more preferably from 0.6 to 13 days, more preferably from 0.8 to 10 days, more preferably from 1 to 7 days, more preferably from 1.5 to 5 days, and more preferably from 2 to 4.5 days. According to the inventive process it is particularly preferred that the heating in step (2) is performed for a duration comprised in the range of from 2.5 to 3.5 days.

Concerning the state in which the mixture provided in step (1) is provided for crystallization in step (2), no particular restriction applies provided that a zeolitic material comprising $YO_2$ in its framework structure may be obtained, such that any grade of admixture may in principle be employed to this effect. It is, however, preferred according to the inventive process that in addition to the admixing of the one or more sources for $YO_2$, one or more fluoride containing compounds, one or more structure directing agents, optional seed crystals, optional one or more sources for $X_2O_3$, and optional sources for $Z_2O_5$, the mixture is further homogenized prior to the crystallization in step (2). According to the inventive process, said preferred homogenization may be achieved by a further mixing step prior to the crystallization in step (2), wherein preferably said additional mixing includes the grinding and/or milling of the mixture provided in step (1) wherein more preferably the mixture provided in step (1) is homogenized by milling thereof prior to the crystallization in step (2).

As for the components which may be further provided in the mixture in step (1) of the inventive process, said process is furthermore not limited to the steps of providing a mixture according to step (1) and crystallizing the mixture obtained in step (1) according to step (2) but may further comprise additional steps performed prior to the provision of a mixture in step (1), and/or between the provision of a mixture in step (1) and its crystallization in step (2) such that as the aforementioned homogenization of the mixture obtained in step (1) prior to its crystallization in step (2), as well as one or more steps performed after the crystallization of a zeolitic material comprising $YO_2$ in its framework structure in step (2). Thus, it is preferred according to the inventive process that the zeolitic material comprising $YO_2$ in its framework structure obtained in step (2) is further subject to a step (3) of calcining the zeolitic material comprising $YO_2$ obtained in step (2).

Therefore, the inventive process according to any one of the particular and preferred embodiments as defined in the present application preferably further comprises (3) calcining the zeolitic material comprising $YO_2$ obtained in step (2).

As regards the temperature at which the preferred calcination may be performed, no particular restriction applies such that calcination may be for example performed at a temperature ranging anywhere from 300 to 900° C. According to the inventive process it is however preferred that in step (3) calcination of the zeolitic material comprising $YO_2$ obtained in step (2) is preformed at a temperature comprised in the range of from 400 to 700° C., and more preferably in the range of from 450 to 650° C., more preferably of from 500 to 600° C.

In addition to relating to a process for the preparation of a zeolitic material comprising $YO_2$ in its framework structure the present invention further relates to the zeolitic material comprising $YO_2$ in its framework structure as said material is obtained according to any of the particular and preferred embodiments of the inventive process as described in the present application. Furthermore, the present invention also relates to a zeolitic material comprising $YO_2$ in its framework structure as it may be obtained, i.e. as obtainable, according to any of the particular and preferred embodiments of the inventive process as described herein. In particular, the present invention relates to a zeolitic material comprising $YO_2$ in its framework structure as said material may be obtained according to the inventive process, yet independently of the method according to which it has actually been prepared or obtained such that the zeolitic material comprising $YO_2$ in its framework structure which is obtainable according to the inventive process is not limited to materials having directly been obtained by said process.

In addition to the aforementioned zeolitic materials, the present invention further relates to a zeolitic material comprising $SiO_2$ in its framework structure, wherein in the $^{29}Si$ MAS NMR of the as-synthesized zeolitic material the ratio of the total integration value of the peaks, and preferably to the deconvoluted peaks, associated to Q3 signals to the total integration value of the peaks, and preferably to the deconvoluted peaks, associated to Q4 signals is in the range of from 0:100 to 20:80.

According to the present invention, there is no particular restriction as to the method according to which the inventive zeolitic material comprising $SiO_2$ in its framework structure having a specific $^{29}Si$ MAS NMR spectrum may be obtained, provided that the ratio of the total integration value of the peaks, and preferably to the deconvoluted peaks, associated to Q3 and Q4 signals of the as-synthesized zeolitic material fulfills the definition in the foregoing. It is, however, preferred according to the present invention that the zeolitic material comprising $SiO_2$ in its framework structure is obtainable and/or obtained according to any of the particular and preferred embodiments of the inventive process wherein the tetravalent element Y comprises Si and further preferably wherein the tetravalent element stands for Si.

As regards the $^{29}Si$ MAS NMR of the as-synthesized zeolitic material comprising $SiO_2$ in its framework structure, there is no particular restriction as to the ratio of the total integration value of the peaks, and preferably to the deconvoluted peaks, associated to Q3 and Q4 signals provided that the ratio of the total integration value of the Q3 signals to the Q4 signals is comprised in the range of from 0:100 to 20:80. According to the present invention it is however preferred that the total integration value of the peaks, and preferably to the deconvoluted peaks, associated to Q3 signals to the total integration value of the peaks, and preferably to the deconvoluted peaks, associated to Q4 signals is comprised in the range of 2:98 to 18:82, more preferably of from 4:96 to 17:83, more preferably of from 6:94 to 16:84, more preferably of from 8:92 to 15:85, and more preferably of from 10:90 to 14:86. According to the present invention it is however particularly preferred that in the $^{29}Si$ MAS NMR spectrum of the as-synthesized zeolitic material the ratio of the total integration value of the peaks, and preferably to the deconvoluted peaks, associated to Q3 signals to the total integration value of the peaks, and preferably to the deconvoluted peaks, associated to Q4 signals is in the range of from 11:89 to 13:87.

Concerning the term "as-synthesized" as employed in the present application, said term indicates that the zeolitic material according to any of the particular and preferred embodiments as defined in the present application has not been subject to any type of post-treatment procedure after its synthesis. In particular, said term indicates the state of the zeolitic material directly after its synthesis, wherein it has at most only been subject to a procedure for isolating it from the reaction mixture such as, for example, by filtering off of the zeolitic material for separating it from the reaction solution, if applicable to the process actually used for its synthesis, and optionally to a further step of washing, preferably with distilled water. According to the present invention it is preferred that the term "as-synthesized" indicates that after its synthesis the zeolitic material has not been subject to a treatment at an elevated temperature and pressure with respect to standard ambient temperature and pressure (SATP), i.e. greater than 25° C. and greater than an absolute pressure of 100 kPa, nor has the zeolitic material been contacted with one or more substances or mixture of substances which may lead to the chemical and/or physical transformation of its framework, and more preferably has not been contacted with one ore more substances other than distilled water after the completed preparation thereof. According to the present invention it is particularly preferred that the term "as-synthesized" designates the zeolitic material directly after its synthesis wherein, after optional isolation and optional purification thereof, it has not been subject to a treatment procedure which would lead to changes in the $^{29}Si$ MAS NMR spectrum thereof, and in particular to the peaks associated to Q3 and Q4 signals as defined according to any of the particular and preferred embodiments of the present invention, and in particular with respect to their ppm values and relative intensities.

As regards the specific measurement of the $^{29}Si$ MAS NMR and the deconvolution of its spectrum, no particular restrictions apply provided that the $^{29}Si$ MAS NMR allows for the detection of the peaks, and preferably to the deconvoluted peaks, associated to Q4 signals and of eventual peaks, and preferably to the deconvoluted peaks, associated to Q3 signals. According to the present invention it is preferred that the deconvolution is performed using the PeakFit software (Version 4.11, Systat Software Inc., San Jose, Calif.). According to the present invention it is however preferred that the measurement of the $^{29}Si$ MAS NMR and the deconvolution thereof is performed according to the procedure described in the experimental section of the present application.

As regards the intensity of the deconvoluted peaks from the Q4 and eventual Q3 signals identified in the $^{29}Si$ MAS NMR spectrum, no particular restriction applies relative to the minimum intensity of the deconvoluted peaks from which the total integration value of the respective Q3 and Q4 signals is calculated. It is, however, preferred according to the present invention that the integration values of the peaks after deconvolution refer to the deconvoluted peaks from the Q4 and eventual Q3 signals displaying a relative intensity of 1% or more based on the total intensity of the deconvoluted peaks from the Q4 and Q3 signals displaying a relative intensity of at least 1%, wherein more preferably the integration values of the peaks after deconvolution refer to deconvoluted peaks from the Q4 and eventual Q3 signals displaying a relative intensity of 2% or more based on the total intensity of the deconvoluted peaks from the Q4 and Q3 signals displaying a relative intensity of at least 2%, and more preferably displaying a relative intensity of 3% or more based on the total intensity of the deconvoluted peaks from the Q4 and Q3 signals displaying a relative intensity of at least 3%, and more preferably displaying a relative intensity of 4% or more based on the total intensity of the deconvoluted peaks from the Q4 and Q3 signals displaying a relative intensity of at least 4%. According to the present invention it is however particularly preferred that the integration values of the peaks after deconvolution refer to the deconvoluted peaks from the Q4 and eventual Q3 signals displaying a relative intensity of 5% or more based on the total intensity of the deconvoluted peaks from the Q4 and Q3 signals displaying a relative intensity of at least 5%.

Concerning the ppm values for the maxima of the Q4 and eventual Q3 signals in the $^{29}$Si MAS NMR of the as-synthesized zeolitic material comprising $SiO_2$ in the framework structure, no particular provisions apply provided that the respective signals may be assigned to Q4 and eventual Q3 signals, i.e. to signals from silicon atoms which have four silicon atoms neighboring them directly via respective oxygen bridges (Q4 silica species $[Si(SiO)_4]$) and silicon atoms having only three silicon atoms directly neighboring them via respective oxygen bridges (Q3 silica species $[Si(SiO)_3(OR)]$ wherein R is not Si, and wherein R is preferably H). According to the present invention it is however preferred that the peaks in the $^{29}$Si MAS NMR spectrum, and preferably the deconvoluted peaks therein, which are associated to Q3 signals refer to the peaks in the $^{29}$Si MAS NMR spectrum located in the range of from −95 to −108.75 ppm, and the peaks, and preferably the deconvoluted peaks, associated to Q4 signals refer to the peaks in the $^{29}$Si MAS NMR spectrum located in the range of from −108.76 to −125 ppm. According to the present invention it is further preferred that the peaks, and preferably the deconvoluted peaks, associated to Q3 signals refer to the peaks in the $^{29}$Si MAS NMR spectrum located in the range of from −98 to −108.7 ppm, and that the peaks, and preferably the deconvoluted peaks, associated to Q4 signals refer to the peaks located in the range of from −108.8 to −122 ppm, more preferably wherein the peaks associated to Q3 signals refer to the peaks located in the range of from −100 to −108.5 ppm, and the peaks associated to Q4 signals refer to the peaks located in the range of from −109 to −120 ppm, and wherein more preferably the peaks associated to the Q3 signals are located in the range of from −101 to −108 ppm and the peaks associated to the Q4 signals are located in the range of from −109.5 to −119 ppm, respectively. According to the present invention it is particularly preferred that the peaks, and preferably the deconvoluted peaks, associated to Q3 signals refer to the peaks in the $^{29}$Si MAS NMR spectrum located in the range of from −101.5 to −107.5 ppm, and the peaks, preferably the deconvoluted peaks, associated to Q4 signals refer to the peaks in the $^{29}$Si MAS NMR spectrum located in the range of from −110 to −118 ppm.

According to the present invention there is no particular restriction as to further components which may be contained in the as-synthesized zeolitic material comprising $SiO_2$ in its framework structure, and in particular with respect to further elements besides Si which may be contained in the framework structure. Thus, it is preferred according to the present invention that the framework structure of the as-synthesized zeolitic material further comprises $X_2O_3$, wherein X stands for a trivalent element. According to said preferred embodiments, no particular restriction applies relative to the trivalent element which may be further comprised in the framework structure, such that any suitable trivalent element or a combination of trivalent elements may be present therein in addition to Si. It is, however, preferred that the trivalent element X is selected from the group consisting of Al, B, In, Ga, Fe, and combinations of two or more thereof. According to the present invention it is particularly preferred that in embodiments wherein the framework structure in the as-synthesized zeolitic material further comprises $X_2O_3$ X comprises Fe and/or B, and preferably comprises B, wherein more preferably X is Fe and/or B, and is preferably B.

Concerning the specific framework structure which the as-synthesized zeolitic material comprising $SiO_2$ therein may have, no particular restrictions apply according to the present invention such that the zeolitic material may in principle have any conceivable framework structure. Thus, by way of example, the as-synthesized zeolitic material of the present invention may have a framework structure selected from the group consisting of BEA, BEC, CHA, EUO, FAU, FER, HEU, ITH, ITW, LEV, MEL, MFI, MOR, MTN, MWW, and TON, including mixed structures of two or more thereof, wherein preferably the zeolitic material has a framework structure selected from the group consisting of BEA, BEC, CHA, EUO, FAU, FER, ITH, ITW, LEV, MFI, MOR, MTN, MWW, and TON, including mixed structures of two or more thereof, and more preferably from the group consisting of BEA, BEC, EUO, ITH, ITW, MFI, MTN, and TON, including mixed structures of two or more thereof. According to the present invention it is particularly preferred that the as-synthesized zeolitic material has a framework structure selected from the group consisting of BEA, EUO, MFI, MTN, and TON, including mixed structures of two or more thereof. It is however, alternatively particularly preferred according to the present invention that the as-synthesized zeolitic material has a framework structure selected from the group consisting of BEC, ITH, and ITW, including mixed structures of two or more thereof.

Although there is principally no limitation as to further components which may be contained in the inventive zeolitic material, it is preferred that the zeolitic material comprising $SiO_2$ in its framework structure according to any of the particular and preferred embodiments of the present invention as defined in the present description does not contain more than a particular amount of specific elements. Thus, by way of example, it is preferred that the inventive zeolitic material comprising $SiO_2$ in its framework structure contains not more than a specific amount of alkali metals and in particular of sodium and/or potassium. More specifically, it is preferred according to the present invention that the inventive zeolitic material comprising $SiO_2$ in its framework structure contains 5 wt.-% or less of Na and/or K, and preferably 5 wt.-% or less of Na, based on 100 wt.-% of $SiO_2$ contained in its framework structure, wherein more preferably the zeolitic material comprising $SiO_2$ in its framework structure contains 3 wt.-% or less of Na and/or K, and preferably of Na, and more preferably 2 wt.-% or less, more preferably 1 wt.-% or less, more preferably 0.5 wt.-% or less, more preferably 0.1 wt.-% or less, more preferably 0.05 wt.-% or less, more preferably 0.01 wt.-% or less, and more preferably 0.005 wt.-% or less of Na and/or K, preferably of Na, based on 100 wt.-% of $SiO_2$ contained in its framework structure. According to the present invention it is however particularly preferred that the inventive zeolitic material contains 0.001 wt.-% or less of Na and/or K, and preferably of Na, based on 100 wt.-% of $SiO_2$ contained in its framework structure.

According to the present invention it is yet further preferred that the inventive zeolitic material comprising $SiO_2$ in its framework structure does not contain more than a specific amount of alkali metals and/or alkaline earth metals. In particular, it is further preferred that the zeolitic material comprising $SiO_2$ in its framework structure contains 5 wt.-% or less of alkali metals and/or alkaline earth metals based on 100 wt.-% of $SiO_2$ contained in its framework structure, wherein more preferably said zeolitic material contains 3 wt.-% or less of alkali metals and/or alkaline earth metals, and more preferably 2 wt.-% or less, more preferably 1 wt.-% or less, more preferably 0.5 wt.-% or less, more preferably 0.1 wt.-% or less, more preferably 0.05 wt.-% or less, more preferably 0.01 wt.-% or less, and more preferably 0.005 wt.-% or less. According to the present invention it is particularly preferred that the inventive zeolitic material comprising $SiO_2$ in its framework structure contains 0.001 wt-% or less of alkali metals and/or alkaline earth metals based on 100 wt.-% of $SiO_2$ contained in its framework structure.

In addition to or alternatively to the preferred limitations concerning the amount of alkali metals and/or alkaline earth metals and in particular of sodium and/or potassium in the inventive zelitic material comprising $SiO_2$ in its framework structure, it is preferred that said zeolitic material contains not more than specific amounts of phosphorus and/or of aluminum. In particular, it is further preferred that the zeolitic material comprising $SiO_2$ in its framework structure contains 5 wt.-% or less of P and/or Al based on 100 wt.-% of $SiO_2$ contained in the inventive zeolitic matrial comprising $SiO_2$ in its framework structure. According to the present invention it is yet further preferred that the zeolitic material contains 3 wt.-% or less of P and/or Al, and more preferably 2 wt.-% or less, more preferably 1 wt.-% or less, more preferably 0.5 wt.-% or less, more preferably 0.1 wt.-% or less, more preferably 0.05 wt.-% or less, more preferably 0.01 wt.-% or less, and more preferably 0.005 wt.-% or less of P and/or Al based on 100 wt.-% of $SiO_2$ contained in its framework structure. According to the present invention it is particularly preferred that the zeolitic material comprising $SiO_2$ in its framework structure contains 0.001 wt.-% or less of P and/or Al based on 100 wt.-% of $SiO_2$ contained in its framework structure.

According to the present invention, there is no particular restrictions as to the surface area which the zeolitic materials may display. Thus, by way of example, the inventive zeolitic materials may display a BET surface area ranging anywhere from 150 to 800 $m^2/g$, wherein preferably, the BET surface area of the inventive zeolitic materials according to any of the particular and preferred embodiments as defined in the present application range from 175 to 700 $m^2/g$, more preferably from 200 to 650 $m^2/g$, more preferably from 225 to 625 $m^2/g$, more preferably from 250 to 600 $m^2/g$, and more preferably from 275 to 575 $m^2/g$. According to the present invention it is however particularly preferred that the zeolitic material displays a BET surface area ranging from 300 to 550 $m^2/g$.

It is however alternatively preferred according to the present invention that the zeolitic material has a BET surface area ranging from 150 to 600 $m^2/g$, and preferably ranging from 175 to 500 $m^2/g$, more preferably from 200 to 450 $m^2/g$, more preferably from 225 to 425 $m^2/g$, more preferably from 250 to 400 $m^2/g$, more preferably from 275 to 375 $m^2/g$, and more preferably from 300 to 350 $m^2/g$.

Yet further it is alternatively preferred according to the present invention that the zeolitic material has a BET surface area ranging from 300 to 800 $m^2/g$, and preferably ranging from 350 to 750 $m^2/g$, more preferably from 400 to 700 $m^2/g$, more preferably from 425 to 650 $m^2/g$, more preferably from 450 to 625 $m^2/g$, more preferably from 475 to 600 $m^2/g$, more preferably from 500 to 575 $m^2/g$, and more preferably from 525 to 550 $m^2/g$.

According to the present invention, there is no particular restriction as to the method according to which the values for the BET surface area of the inventive zeolitic materials is determined, such that in principle any suitable method may be employed to this effect. According to the present invention it is however preferred that the values for the BET surface area as indicated in the present application are obtained in accordance with the ISO 9277:2010 measurement standard.

Finally, the present invention also relates to the use of the zeolitic materials as obtained and/or obtainable according to any of the particular and preferred embodiments of the inventive process as described in the present application as well as to the use of the inventive zeolitic material comprising $SiO_2$ in its framework structure according to any of the particular and preferred embodiments described in the present application. In this respect, although in principle no particular restriction apply to the possible applications in which the aforementioned inventive materials may be employed, the present invention particularly relates to their use as a molecular sieve, as an adsorbent, for ion-exchange, as a catalyst and/or as a catalyst support.

The present invention includes the following embodiments, wherein these include the specific combinations of embodiments as indicated by the respective interdependencies defined therein:

1. A process for the preparation of a zeolitic material comprising $YO_2$ in its framework structure, wherein Y stands for a tetravalent element, wherein said process comprises the steps of:
   (1) providing a mixture comprising one or more sources for $YO_2$, one or more fluoride containing compounds, and one or more structure directing agents;
   (2) crystallizing the mixture obtained in step (1) for obtaining a zeolitic material comprising $YO_2$ in its framework structure;
   wherein the mixture provided in step (1) and crystallized in step (2) contains 35 wt.-% or less of $H_2O$ based on 100 wt.-% of $YO_2$ contained in the mixture provided in step (1) and crystallized in step (2), preferably 30 wt.-% or less, more preferably 25 wt.-% or less, more preferably 20 wt.-% or less, more preferably 25 wt.-% or less, more preferably 10 wt.-% or less, more preferably 5 wt.-% or less, more preferably 3 wt.-% or less, more preferably 1 wt.-% or less, more preferably 0.5 wt.-% or less, more preferably 0.1 wt.-% or less, more preferably 0.05 wt.-% or less, and more preferably 0.01 wt.-% or less based on 100 wt.-% of $YO_2$.

2. The process of embodiment 1, wherein the zeolitic material crystallized in step (2) has a framework structure selected from the group consisting of BEA, BEC, CHA, EUO, FAU, FER, HEU, ITH, ITW, LEV, MEL, MFI, MOR, MTN, MWW, and TON, including mixed structures of two or more thereof, preferably from the group consisting of BEA, BEC, CHA, EUO, FAU, FER, ITH, ITW, LEV, MFI, MOR, MTN, MWW, and TON, including mixed structures of two or more thereof, more preferably from the group consisting of BEA, BEC, EUO, ITH, ITW, MFI, MTN, and TON, including mixed structures of two or more thereof, and more preferably from the group consisting of BEC, ITH, and ITW, including mixed structures of two or more thereof, or from the group consisting of BEA, EUO, MFI, MTN, and TON, including mixed structures of two or more thereof.

3. The process of embodiment 1 or 2, wherein Y is selected from the group consisting of Si, Sn, Ti, Zr, Ge, and mixtures of two or more thereof, Y preferably being Si.
4. The process of any of embodiments 1 to 3, wherein the one or more sources for $YO_2$ comprises one or more compounds selected from the group consisting of silicas, silicates, silicic acid and combinations of two or more thereof, preferably selected from the group consisting of silicas, alkali metal silicates, silicic acid, and combinations of two or more thereof, more preferably selected from the group consisting of fumed silica, colloidal silica, reactive amorphous solid silica, silica gel, pyrogenic silica, lithium silicates, sodium silicates, potassium silicates, silicic acid, and combinations of two or more thereof, more preferably selected from the group consisting of fumed silica, silica gel, pyrogenic silica, sodium silicates, silicic acid, and combinations of two or more thereof, more preferably selected from the group consisting of fumed silica, silica gel, pyrogenic silica, and combinations of two or more thereof, wherein more preferably the one or more sources for $YO_2$ is fumed and/or pyrogenic silica, preferably fumed silica.
5. The process of any of embodiments 1 to 4, wherein the one or more fluoride containing compounds comprise one or more fluoride salts and/or hydrogen fluoride, preferably hydrogen fluoride and/or one or more fluoride salts selected from the group consisting of ammonium fluoride, metal fluorides, organic fluoride salts, and mixtures of two or more thereof, more preferably from the group consisting of ammonium fluoride, alkali metal fluorides, alkaline earth metal fluorides, alkylammonium fluorides, and mixtures of two or more thereof, more preferably from the group consisting of ammonium fluoride, alkali metal fluorides, mono($C_1$-$C_4$)alkylammonium fluorides, di($C_1$-$C_4$)alkylammonium fluorides, tri($C_1$-$C_4$)alkylammonium fluorides, tetra($C_1$-$C_4$)alkylammonium fluorides, and mixtures of two or more thereof, more preferably from the group consisting of ammonium fluoride, lithium fluoride, sodium fluoride, potassium fluoride, rubidium fluoride, cesium fluoride, mono($C_1$-$C_3$)alkylammonium fluorides, di($C_1$-$C_3$)alkylammonium fluorides, tri($C_1$-$C_3$)alkylammonium fluorides, tetra($C_1$-$C_3$)alkylammonium fluorides, and mixtures of two or more thereof, more preferably from the group consisting of ammonium fluoride, lithium fluoride, sodium fluoride, potassium fluoride, mono($C_1$-$C_2$)alkylammonium fluorides, di($C_1$-$C_2$)alkylammonium fluorides, tri($C_1$-$C_2$)alkylammonium fluorides, tetra($C_1$-$C_2$)alkylammonium fluorides, and mixtures of two or more thereof, wherein more preferably the one or more fluoride containing compounds comprise one or more selected from the group consisting of ammonium fluoride, hydrogen fluoride, sodium fluoride, potassium fluoride, and mixtures of two or more thereof, wherein more preferably the one or more fluoride containing compounds comprise ammonium fluoride and/or hydrogen fluoride, preferably ammonium fluoride, wherein more preferably the ammonium fluoride is employed as the one or more fluoride containing compounds in the mixture provided in step (1) and crystallized in step (2).
6. The process of any of embodiments 1 to 5, wherein the one or more structure directing agents provided in step (1) comprise one or more organic compounds, wherein the one or more organic compounds are preferably selected from the group consisting of alkanes and derivatives thereof, amines, ammonium salts, imidazolinium salts, and mixtures of two or more thereof, more preferably from the group consisting of tetraalkylammonium salts, alkenyltriakylammonium salts, aryltrialkylammonium salts, dialkyldiarylammonium salts, heterocyclic amines, heterocyclic ammonium salts, adamantylammonium salts, alkylenediammonium salts, N-alkyl-trialkyleneammonium salts, N,N-diaryl-trialkyleneammonium salts, alkylamines, cycloalkylammonium salts, dialkylammonium salts, quinuclidine and derivatives thereof, quinuclidinium salts, norbornane and derivatives thereof, trialkylenediamines, trialkylimidazolinium salts, and mixtures of two or more thereof,
more preferably from the group consisting of tetramethylammonium salts, trimethylethyammonium salts, dimethyldiethylammonium salts, methyltriethylammonium salts, tetraethylammonium salts, triethylpropylammonium salts, diethyldipropylammonium salts, ethyltripropylammonium salts, tetrapropylammonium salts, trimethylpropylammonium salts, dimethyldipropylammonium salts, methyltripropylammonium salts, N-(2-propen-1-yl)-tri-n-propylammonium salts, N-(1-propen-1-yl)-tri-n-propylammonium salts, N-(1-propen-2-yl)-tri-n-propylammonium salts, N,N,N-tri($C_1$-$C_3$)alkylbenzylammonium salts, N,N,N-di($C_1$-$C_3$)alkyldibenzylammonium salts, ($C_4$-$C_6$)heterocyclic amines, ($C_4$-$C_6$)heterocyclic ammonium salts, N,N,N—($C_1$-$C_3$)trialkyl-adamantylammonium salts, N,N,N,N,N,N-hexa($C_1$-$C_3$) alkyl-($C_3$-$C_7$)alkylenediammonium salts, N,N-di($C_1$-$C_3$) alkyl-tri($C_1$-$C_3$)alkyleneammonium salts, N,N-diaryl-tri($C_1$-$C_3$)alkylenediammonium salts, tri($C_1$-$C_3$)alkylamines, di($C_1$-$C_3$)alkyl($C_5$-$C_7$)cycloalkylamines, ($C_1$-$C_3$)alkyl($C_5$-$C_7$)dicycloalkylamines, ($C_3$-$C_7$)alkylenediamines, N,N,N,N-tetra($C_1$-$C_2$)alkyl($C_3$-$C_7$)alkylenediamines, N,N,N-tri($C_1$-$C_2$)alkyl($C_5$-$C_7$)cycloalkylammonium salts, azoniobicyclo($C_6$-$C_{10}$)alkanes, guinuclidinol and derivatives thereof, N—($C_1$-$C_3$)alkylquinuclidinium salts, aminonorbornanes and derivatives thereof, tri($C_1$-$C_3$)alkylenediamines, tri($C_1$-$C_3$)alkylimidazolinium salts, and mixtures of two or more thereof, more preferably from the group consisting of tetramethylammonium salts, dimethyldiethylammonium salts, tetraethylammonium salts, diethyldipropylammonium salts, tetrapropylammonium salts, dimethyldipropylammonium salts, N-(2-propen-1-yl)-tri-n-propylammonium, N-(1-propen-1-yl)-tri-n-propylammonium salts, N,N,N-triethylbenzylammonium salts, N,N,N-ethyldimethylbenzylammonium salts, N,N,N-diethylmethylbenzylammonium salts, N,N,N-diethyldibenzylammonium salts, N,N,N-trimethylbenzylammonium salts, N,N,N-dimethyldibenzylammonium salts, N,N,N-dimethyldibenzylammonium salts, N,N,N-ethylmethyldibenzylammonium salts, N,N,N-diethyldibenzylammonium salts, N,N,N-ethylpropyldibenzylammonium salts, N,N,N-methylpropyldibenzylammonium salts, N,N,N-dipropyldibenzylammonium salts, ($C_5$-$C_6$)heterocylcic amines, N,N—($C_1$-$C_3$)dialkyl-imidazolinium salts, N,N-di($C_1$-$C_3$)alkylpiperidinium salts, N,N,N—($C_1$-$C_2$)trialkyl-adamantylammonium salts, N,N,N,N,N,N-hexa($C_1$-$C_2$) alkyl-($C_5$-$C_7$)alkylenediammonium salts, N,N-di($C_1$-$C_2$) alkyl-tri($C_1$-$C_2$)alkyleneammonium salts, N,N-dibenzyl-tri($C_1$-$C_2$)alkylenediammonium salts, ($C_5$-$C_6$) cycloalkylamines, tri($C_1$-$C_2$)alkylamines, di($C_1$-$C_2$)alkyl($C_5$-$C_6$)cycloalkylamines, ($C_1$-$C_2$)alkyl($C_5$-$C_6$) dicycloalkylamines, ($C_4$-$C_6$)alkylenediamines, N,N,N,N-tetra($C_1$-$C_2$)alkyl($C_4$-$C_6$)alkylenediamines, N,N,N-tri($C_1$-$C_2$)alkyl($C_5$-$C_6$)cycloalkylammonium salts, azonio-bicyclo($C_7$-$C_9$)alkanes, 3-quinuclidinol and derivatives thereof, N—($C_1$-$C_2$)alkylquinuclidinium salts, aminonorbornanes and derivatives thereof, tri($C_1$-$C_2$)alkylenediamines, 1,2,3-tri($C_1$-$C_2$)alkylimidazolinium salts, and mixtures of two or more thereof, more preferably from the group consisting of tetrapropylammonium salts, tetraethylammonium salts, diethyldimethylammonium salts, N-(2-propen-1-yl)-tri-n-propylammonium salts, N,N,N-trimethylbenzylammonium salts, N,N,N-dibenzyldimethylammonium salts, hexamethyleneimine, 1-ethyl-3-methylimidazolium salts, N,N-dimethyl-3,3-dimethylpipendinium salts, N,N-methylethyl-3,3-dimethylpiperidinium salts, N,N-dimethyl-2-methylpiperidinium salts, N,N,N-trimethyl-1-adamantylammonium salts, N,N,N-trimethyl-2-adamantylammonium salts, hexamethonium salts, 1-methyl-1-azonia-4-azabicyclo[2.2.2]octane, 1,4-dibenzyl-1,4-diazoniabicyclo[2.2.2]octane, cyclohexylamine, N,N-dimethylcyclohexylamine, N,N,N-trimethylcyclohexylammonium salts, 1,3,3,6,6-pentamethyl-6-azoniobicyclo[3.2.1]octane, N-alkyl-3-quinuclidinol, N-methylquinuclidinium salts, N,N,N-trialkyl-exoaminonorbornane, triethylenediamine, and mixtures of two or more thereof, wherein more preferably the one or more structure directing agents provided in step (1) comprise one or more organic compounds selected from the group consisting of tetrapropylammonium salts, tetraethylammonium salts, hexamethonium salts, 1-ethyl-3-methylimidazolium salts, triethylenediamine, 1,2,3-trimethylimidazolinium salts, and mixtures of two or more thereof.

7. The process of embodiment 6, wherein independently from one another, the anion of the ammonium salts is selected from the group consisting of hydroxide, halides, nitrate, nitrite, sulfates, sulfite, phosphates, phosphites, cyanide, and combinations of two or more thereof, preferably from the group consisting of hydroxide, fluoride, chloride, bromide, iodide, nitrate, sulfate, hydrogensulfate, dihydrogensulfate, cyanide, and combinations of two or more thereof, more preferably from the group consisting of hydroxide, chloride, bromide, iodide, nitrate, and combinations of two or more thereof, more preferably from the group consisting of chloride, bromide, iodide, and combinations of two or three thereof, wherein more preferably the anion of the ammonium salts is iodide and/or bromide, preferably bromide.

8. The process of any of embodiments 1 to 7, wherein the molar ratio of the one or more structure directing agents:$YO_2$ in the mixture provided in step (1) and crystallized in step (2) ranges from 0.01 to 2, preferably from 0.03 to 1, more preferably from 0.05 to 0.5, more preferably from 0.07 to 0.3, more preferably from 0.1 to 0.25, and even more preferably from 0.15 to 0.2.

9. The process of any of embodiments 1 to 8, wherein the molar ratio of fluoride:$YO_2$ in the mixture provided in step (1) and crystallized in step (2) is in the range of from 0.01 to 5, preferably of from 0.05 to 3, more preferably of from 0.1 to 2, more preferably of from 0.15 to 1.5, more preferably of from 0.25 to 1.25, and more preferably of from 0.5 to 1.0.

10. The process of any of embodiments 1 to 9, wherein seed crystals are further provided in step (1), preferably in an amount in the range of from 0.1 to 20 wt.-% based on 100 wt.-% of $YO_2$ contained in the mixture provided in step (1) and crystallized in step (2), preferably from 0.3 to 15 wt.-%, more preferably from 0.5 to 12 wt.-%, more preferably from 1 to 10 wt.-%, more preferably from 2 to 8 wt.-%, and even more preferably from 5 to 7 wt.-% based on 100 wt.-% of $YO_2$.

11. The process of embodiment 10, wherein the seed crystals comprise one or more zeolitic materials, wherein the one or more zeolitic materials preferably have a framework structure selected from the group consisting of BEA, CHA, EUO, FAU, FER, HEU, ITH, LEV, MEL, MFI, MOR, MTN, MWW, and TON, including mixed structures of two or more thereof, more preferably from the group consisting of BEA, CHA, EUO, FAU, FER, ITH, LEV, MFI, MOR, MTN, MWW, and TON, including mixed structures of two or more thereof, more preferably from the group consisting of BEA, EUO, ITH, including mixed structures of two or three thereof, wherein more preferably the one or more zeolitic materials comprised in the seed crystals either have the ITH or the BEA and/or EUO framework structure.

12. The process of embodiment 10, wherein the seed crystals comprise one or more zeolitic materials having the framework structure of the zeolitic material comprising $YO_2$ obtained according to any one of embodiments 1 to 12 and 14 to 23, wherein preferably the zeolitic material of the seed crystals is preferably obtainable and/or obtained according to any one of embodiments 1 to 12 and 14 to 23.

13. The process of any of embodiments 1 to 12, wherein one or more sources of $X_2O_3$ are further provided in step (1), wherein X stands for a trivalent element, wherein X is preferably selected from the group consisting of Al, B, In, Ga, Fe, and combinations of two or more thereof, more preferably from the group consisting of Al, B, Fe, and combinations of two or more thereof, X preferably being Fe and/or B, and more preferably being B.

14. The process of any of embodiments 1 to 13, wherein one or more sources of $Z_2O_5$ are further provided in step (1), wherein Z stands for a pentavalent element, wherein Z is preferably selected from the group consisting of P, As, Sb, Bi, V, Nb, Ta, and combinations of two or more thereof, preferably from the group consisting of P, As, V, and combinations of two or more thereof, wherein more preferably Z is P and/or As, preferably P.

15. The process of any of embodiments 1 to 14, wherein the mixture provided in step (1) and crystallized in step (2) contains 5 wt.-% or less of Na and/or K, preferably Na based on 100 wt.-% of $YO_2$ contained in the mixture provided in step (1) and crystallized in step (2), preferably 3 wt.-% or less, more preferably 2 wt.-% or less, more preferably 1 wt.-% or less, more preferably 0.5 wt.-% or less, more preferably 0.1 wt.-% or less, more preferably 0.05 wt.-% or less, more preferably 0.01 wt.-% or less, more preferably 0.005 wt.-% or less, more preferably 0.001 wt.-% or less of Na and/or K, preferably Na based on 100 wt.-% of $YO_2$.

16. The process of embodiment 15, wherein the mixture provided in step (1) and crystallized in step (2) contains 5 wt.-% or less of alkali metals and/or alkaline earth metals based on 100 wt.-% of $YO_2$ contained in the mixture provided in step (1) and crystallized in step (2), preferably 3 wt.-% or less, more preferably 2 wt.-% or less, more preferably 1 wt.-% or less, more preferably 0.5 wt.-% or less, more preferably 0.1 wt.-% or less, more preferably 0.05 wt.-% or less, more preferably 0.01 wt.-% or less, more preferably 0.005 wt.-% or less, more preferably 0.001 wt.-% or less of alkali metals and/or alkaline earth metals based on 100 wt.-% of $YO_2$.

17. The process of any of embodiments 1 to 16, wherein the mixture provided in step (1) and crystallized in step (2) contains 5 wt.-% or less of P and/or Al based on 100 wt.-% of $YO_2$ contained in the mixture provided in step (1) and crystallized in step (2), preferably 3 wt.-% or less, more preferably 2 wt.-% or less, more preferably 1 wt.-% or less, more preferably 0.5 wt.-% or less, more preferably 0.1 wt.-% or less, more preferably 0.05 wt.-% or less, more preferably 0.01 wt.-% or less, more preferably 0.005 wt.-% or less, more pre erably 0.001 wt.-% or less of P and/or Al based on 100 wt.-% of $YO_2$.

18. The process of any of embodiments 1 to 17, wherein crystallization in step (2) involves heating of the mixture, preferably at a temperature ranging from 80 to 220° C., preferably from 100 to 200° C., more preferably from 110 to 190° C., and even more preferably from 120 to 180° C.

19. The process of embodiment 18, wherein in step (2) the mixture is crystallized under autogenous pressure, wherein preferably crystallization in step (2) is performed in a pressure tight vessel, preferably in an autoclave.

20, The process of embodiment 18 or 19, wherein the crystallization in step (2) involves heating of the mixture for a period ranging from 0.1 to 50 d, preferably from 0.3 to 30 d, more preferably from 0.6 to 13 d, more preferably from 0.8 to 10 d, more preferably from 1 to 7 d, more preferably from 1.5 to 5 d, more preferably from 2 to 4.5 d, and even more preferably from 2.5 to 3.5 d.

21. The process of any of embodiments 1 to 20, wherein after providing the mixture in step (1) and prior to the crystallization in step (2), the mixture is homogenized, preferably by mixing, and more preferably by grinding and/or milling, more preferably by milling of the mixture provided in step (1).

22. The process of any of embodiments 1 to 21, wherein the (3) calcining the zeolitic material comprising $YO_2$ obtained in step (2).

23. The process of embodiment 22, wherein the calcination is performed at a temperature in the range of from 300 to 900° C., preferably of from 400 to 700° C., more preferably of from 450 to 650° C., and more preferably of from 500 to 600° C.

24. A zeolitic material comprising $YO_2$ in its framework structure obtainable and/or obtained according to the process of any of embodiments 1 to 23.

25. A zeolitic material comprising $SiO_2$ in its framework structure, preferably obtainable and/or obtained according to the process of any of embodiments 1 to 23, wherein in the $^{29}Si$ MAS NMR spectrum of the as-synthesized zeolitic material the ratio of the total integration value of the peaks, and preferably to the deconvoluted peaks, associated to Q3 signals to the total integration value of the peaks, and preferably to the deconvoluted peaks, associated to Q4 signals is in the range of from 0:100 to 20:80, preferably of from 2:98 to 18:82, more preferably of from 4:96 to 17:83, more preferably of from 6:94 to 16:84, more preferably of from 8:92 to 15:85, more preferably of from 10:90 to 14:86, and more preferably of from 11:89 to 13:87.

26. The zeolitic material of embodiment 25, wherein the peaks, and preferably to the deconvoluted peaks, associated to Q3 signals refer to the peaks in the $^{29}Si$ MAS NMR spectrum located in the range of from −95 to −108.75 ppm, preferably of from −98 to −108.7 ppm, more preferably of from −100 to −108.5 ppm, more preferably of from −101 to −108 ppm, and more preferably of from −101.5 to −107.5 ppm,
and wherein the peaks, and preferably the deconvoluted peaks, associated to Q4 signals refer to the peaks in the $^{29}Si$ MAS NMR spectrum located in the range of from −108/6 to −125 ppm, preferably of from −108.8 to −122 ppm, more preferably of from −109 to −120 ppm, more preferably of from −109.5 to −119 ppm, and more preferably of from −110 to −118 ppm.

27. The zeolitic material of embodiment 25, wherein the framework structure of the zeolitic material further comprises $X_2O_3$, wherein X stands for a trivalent element, and wherein X is preferably selected from the group consisting of Al, B, In, Ga, Fe, and combinations of two or more thereof, X preferably being Fe and/or B, and more preferably being B.

28. The zeolitic material of embodiment 25 or 26, wherein the zeolitic material has a framework structure selected from the group consisting of BEA, BEC, CHA, EUO, FAU, FER, HEU, ITH, ITW, LEV, MEL, MFI, MOR, MTN, MWW, and TON, including mixed structures of two or more thereof, preferably from the group consisting of BEA, BEC, CHA, EUO, FAU, FER, ITH, ITW, LEV, MFI, MOR, MTN, MWW, and TON, including mixed structures of two or more thereof, more preferably from the group consisting of BEA, BEC, EUO, ITH, ITW, MFI, MTN, and TON, including mixed structures of two or more thereof, and more preferably from the group consisting of BEC, ITH, and ITW, including mixed structures of two or more thereof, or from the group consisting of BEA, EUO, MFI, MTN, and TON, including mixed structures of two or more thereof.

29. The zeolitic material of any of embodiments 25 to 27, wherein the zeolitic material contains 5 wt.-% or less of Na and/or K, preferably Na based on 100 wt.-% of $SiO_2$ contained in its framework structure, preferably 3 wt.-% or less, more preferably 2 wt.-% or less, more preferably 1 wt.-% or less, more preferably 0.5 wt.-% or less, more preferably 0.1 wt.-% or less, more preferably 0.05 wt.-% or less, and more preferably 0.01 wt.-% or less, more preferably 0.005 wt.-% or less, more preferably 0.001 wt.-% or less of Na and/or K, preferably Na based on 100 wt.-% of $SiO_2$.

30. The zeolitic material of embodiment 28, wherein the zeolitic material contains 5 wt.-% or less of alkali metals and/or alkaline earth metals based on 100 wt.-% of $SiO_2$ contained in its framework structure, preferably 3 wt.-% or less, more preferably 2 wt.-% or less, more preferably 1 wt.-% or less, more preferably 0.5 wt.-% or less, more preferably 0.1 wt.-% or less, more preferably 0.05 wt.-% or less, and more preferably 0.01 wt.-% or less, more preferably 0.005 wt.-% or less, more preferably 0.001 wt.-% or less of alkali metals and/or alkaline earth metals based on 100 wt.-% of $SiO_2$.

31. The zeolitic material of any of embodiments 25 to 30, wherein the zeolitic material contains 5 wt.-% or less of P and/or Al based on 100 wt.-% of $SiO_2$ contained in its framework structure, preferably 3 wt.-% or less, more preferably 2 wt.-% or less, more preferably 1 wt.-% or less, more preferably 0.5 wt.-% or less, more preferably 0.1 wt.-% or less, more preferably 0.05 wt.-% or less, and more preferably 0.01 wt.-% or less, more preferably 0.005 wt.-% or less, more preferably 0.001 wt.-% or less of P and/or Al based on 100 wt.-% of $SiO_2$.

32. The zeolitic material of any of embodiments 25 to 31, wherein the zeolitic material has a BET surface area detrmined according to ISO 9277:2010 ranging from 150 to 800 m²/g, preferably from 175 to 700 m²/g, more preferably from 200 to 650 m²/g, more preferably from 225 to 625 m²/g, more preferably from 250 to 600 m²/g, more preferably from 275 to 575 m²/g, and more preferably from 300 to 550 m²/g.

33. Use of a zeolitic material according to any of embodiments 24 to 32 as a molecular sieve, as an adsorbent, for ion-exchange, as a catalyst and/or as a catalyst support.

EXAMPLES

X-ray diffraction experiments on the powdered materials were performed using a Rigaku Ultimate VI X-ray diffractometer using the Cu K alpha-1 radiation ($\lambda$=1.5406 Å).

$^{29}$Si MAS solid-state NMR experiments with ($^1$H-$^{29}$Si) cross polarization were performed using a Bruker AVANCE 500 spectrometer with 500 MHz $^1$H Larmor frequency. Samples were packed in 4 mm ZrO$_2$ rotors, and measured under 10 kHz Magic Angle Spinning at room temperature. $^{29}$Si spectra were obtained using $^{29}$Si ($\pi$/2)-pulse excitation with 4 µs pulse width, a $^{29}$Si carrier frequency corresponding to –95.6 ppm in the spectrum, and a scan recycle delay of 10 s. Signal was acquired for 10 ms under 27.78 kHz high-power proton decoupling, and accumulated for up to 17 hours. Spectra were processed using Bruker Topspin with 30 Hz exponential line broadening, manual phasing, and manual baseline correction over the full spectrum width. Deconvolution of the spectra was achieved using the PeakFit software (Version 4.11, Systat Software Inc., San Jose, Calif.), wherein the baseline setting "Linear, D2" was employed with a tolerance ("Tol %") of 3.0%, smoothing ("Sm %") was set to a value of 1.00%, the peak type settings "Spectroscopy" and "Lorentz Area" were used, and the autoscan was set to an amplitude ("Amp %") of 1.50% using the "Vary Widths" option. Spectra were referenced with Kaolinite as an external secondary standard, by setting the resonance of silica to –91.5 ppm.

Example 1: Solidothermal Synthesis of Silicalite-1

1.6 g of solid silica gel (Qingdao Haiyang Chemical Reagent Co., Ltd.), 0.15 g of NH$_4$F (98%, Aladdin Chemistry Co., Ltd.), and 0.25 g of tetrapropylammonium bromide (98%, Aladdin Chemistry Co., Ltd.) were added into a mortar one by one and mixed together. After grinding for 5 minutes, the powder mixture was transferred to an autoclave and sealed. After heating at 180° C. for 15 h, the sample was fully crystallized.

Figure 1:
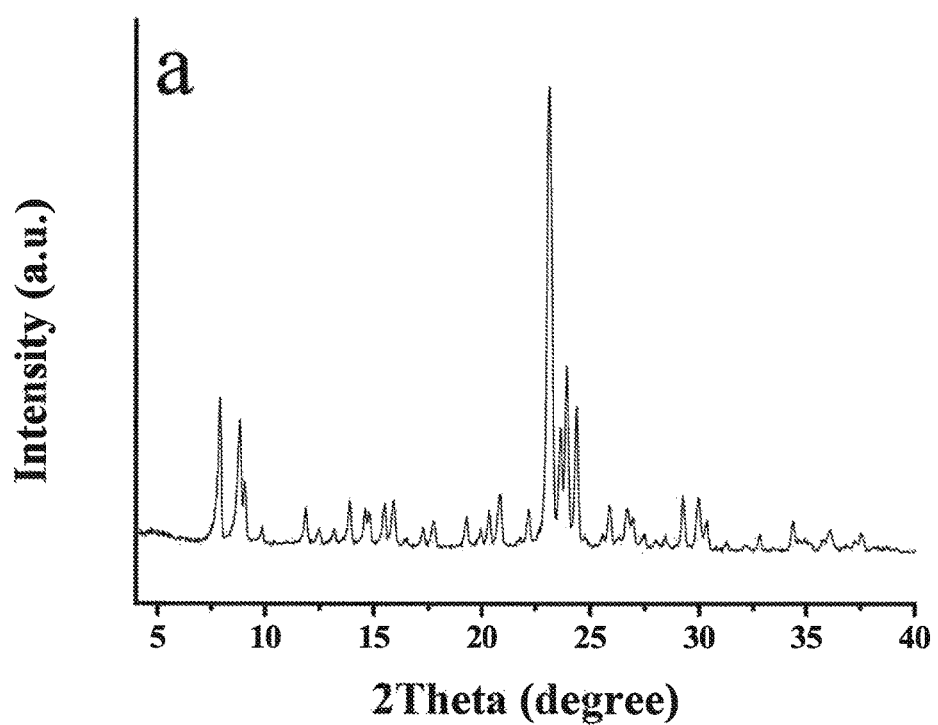
FIG. 1 shows the X-ray diffraction pattern (measured using Cu K alpha-1 radiation) of the crystalline material obtained according to Example 1. In the figure, the angle 2 theta in ° is shown along the abscissa and the intensities are plotted along the ordinate.

The XRD pattern of the zeolite product obtained in Example 1 which displays the MFI-type framework structure is shown in FIG. 1.

Figure 2:
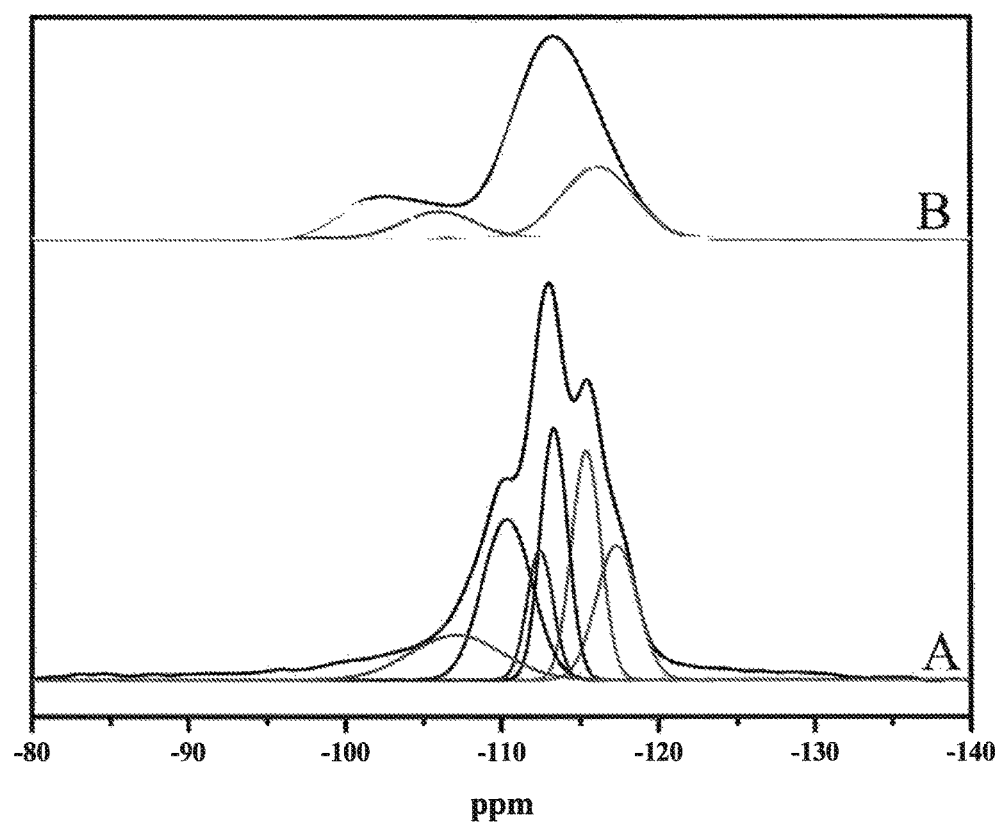
FIG. 2 shows the (deconvoluted) $^{29}$Si CP-MAS NMR obtained from the sample from Example 1 as spectrum "A" in the lower portion of the figure. For comparative purposes, the (deconvoluted) $^{29}$Si CP MAS NMR of a sample obtained from synthesis of Silicalite-1 in the presence of crystallization water is displayed as comparative spectrum "B" in the upper portion of the figure. In the figure, the values in ppm are plotted along the abscissa.

Furthermore, the deconvoluted $^{29}$Si CP-MAS NMR spectrum of the crystalline product is displayed in spectrum "A" of FIG. 2. More specifically, the deconvolution afforded peaks assigned to Q4 signals at –117.3 ppm (16%), –115.4 ppm (19%), –113.3 ppm (20%), –112.5 ppm (10%), and –110.4 ppm (23%), wherein the integration value for the respective peak is indicated in parentheses, and a single Q3 signal at –107.1 ppm (12%).

For comparative purposes, the deconvoluted $^{29}$Si CP-MAS NMR spectrum obtained for Sili-calite-1 prepared in the presence of cristallyzation water contained in the reaction mixture is displayed in comparative spectrum "B" of FIG. 2, wherein deconvolution affords peaks assigned to Q4 signals at –116.1 ppm (23%) and –112.8 ppm (56%), and two Q3 signals at –106.0 ppm (9%) and –101.7 ppm (12%).

Thus, as may be taken from a comparison of the $^{29}$Si NMR spectra in FIG. 2, a considerably larger amount of Q3 signals are observed in comparative spectrum "B" which displays a ratio of the total integration value of the peaks associated to Q3 signals to the total integration value of the peaks associated to Q4 signals of 21:79. As opposed thereto, the $^{29}$Si NMR spectrum of the inventive material only displays a ratio of the total integration value of the peaks associated to Q3 signals to the total integration value of the peaks associated to Q4 signals of 12:88. Accordingly, Silicatlite-1 obtained according to the inventive method in the absence of water in the reaction mixture displays clearly less structural defects in the framework structure due to a portion of the SiO$_4$-tetrahedra not being linked to four neighboring SiO$_4$-tetrahedra, which may accordingly be detected as Q3 signals in the $^{29}$Si NMR spectrum.

Example 2: Solidothermal Synthesis of Zeolite Beta 1.6 g of solid silica gel (Qingdao Haiyang Chemical Reagent Co., Ltd.), 1.25 g of NH$_4$F (98%, Aladdin Chemistry Co., Ltd.), 1.75 g of tetraethylammonium bromide (98%, Aladdin Chemistry Co., Ltd.), and 0.16 g of zeolite beta seeds (Si/Al molar ratio=12.5) were added into a mortar one by one and mixed together. After grinding for 5 minutes, the powder mixture was transferred to an autoclave and sealed. After heating at 140° C. for 5 d, the sample was fully crystallized.

Figure 3:
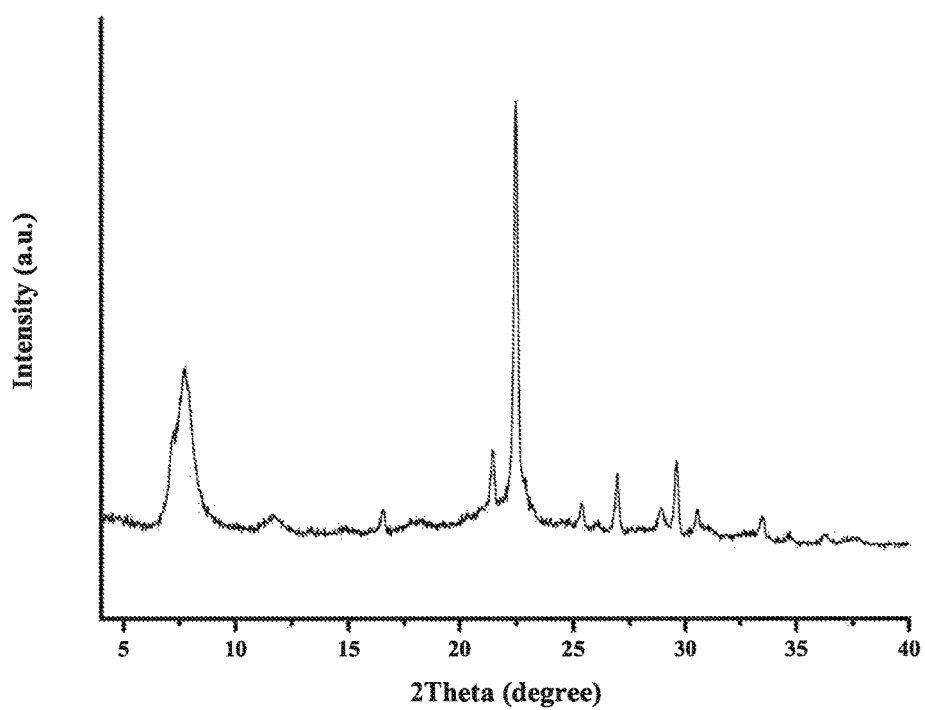
FIGS. 3-7 and 12 show the X-ray diffraction patterns (measured using Cu K alpha-1 radiation) of the crystalline materials obtained according to Examples 2-5, 8, and 10, respectively. In the respective figures, the angle 2 theta in ° is shown along the abscissa and the intensities in arbitrary units are plotted along the ordinate.

The XRD pattern of the zeolite product obtained in Example 2 which displays the BEA-type framework structure is shown in FIG. 3.

Example 3: Solidothermal Synthesis of EU-1

1.6 g of solid silica gel (Qingdao Haiyang Chemical Reagent Co., Ltd.), 1.0 g of NH$_4$F (98%, Aladdin Chemistry Co., Ltd.), 1.0 g of hexamethonium bromide (J&K Scientific Co., Ltd.), and 0.1 g of EU-1 seeds (Si/Al molar ratio=25) were added into a mortar one by one and mixed together. After grinding for 5 minutes, the powder mixture was transferred to an autoclave and sealed. After heating at 180° C. for 3 d, the sample was fully crystallized.

Figure 4:
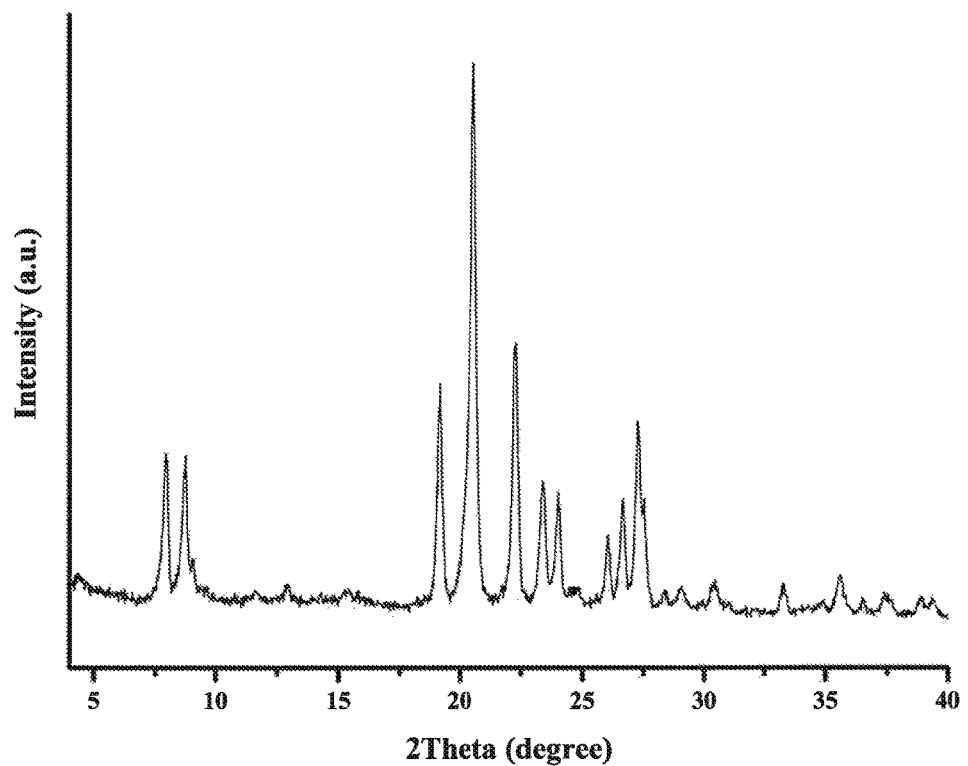

The XRD pattern of the zeolite product obtained in Example 3 which displays the EUO-type framework structure is shown in FIG. 4.

Example 4: Solidothermal Synthesis of ZSM-22

1.6 g of solid silica gel (Qingdao Haiyang Chemical Reagent Co., Ltd.), 1.0 g of $NH_4F$ (98%, Aladdin Chemistry Co., Ltd.), and 0.51 g of 1-ethyl-3-methylimidazolium (98%, Shanghai Cheng Jie Chemical Co., Ltd.) were added into a mortar one by one and mixed together. After grinding for 5 minutes, the powder mixture was transferred to an autoclave and sealed. After heating at 180° C. for 3 d, the sample was fully crystallized.

Figure 5:
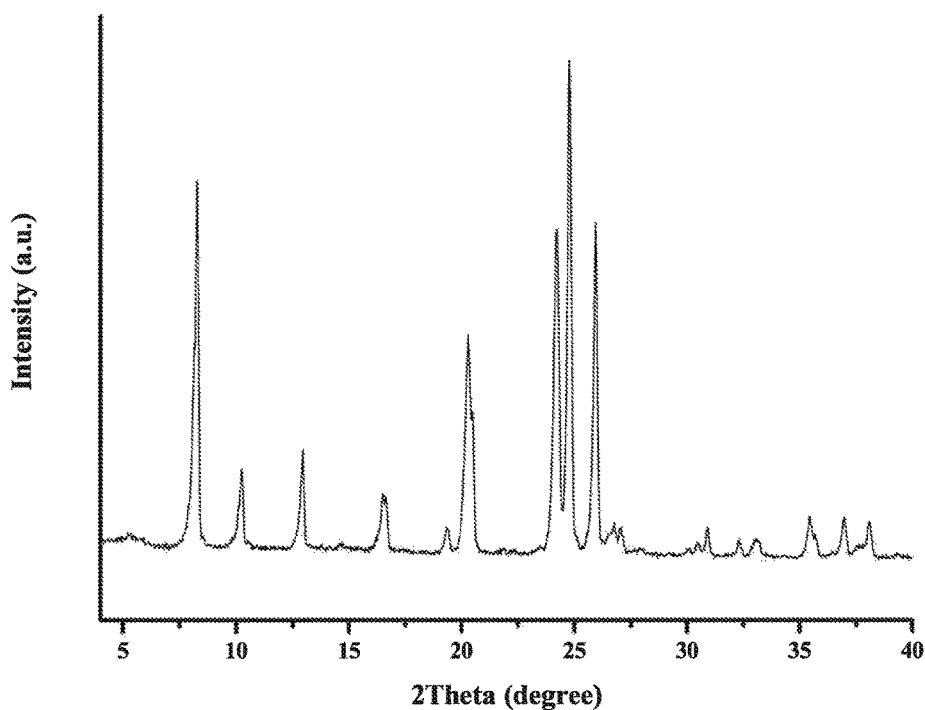

The XRD pattern of the zeolite product obtained in Example 4 which displays the TON-type framework structure is shown in FIG. 5.

Example 5: Solidothermal Synthesis of ZSM-39

1.6 g of solid silica gel (Qingdao Haiyang Chemical Reagent Co., Ltd.), 1.0 g of $NH_4F$ (98%, Aladdin Chemistry Co., Ltd.), and 0.8; g of triethylenediamine (98%, Aladdin Chemistry Co., Ltd.) were added into a mortar one by one and mixed together. After grinding for 5 minutes, the powder mixture was transferred to an autoclave and sealed. After heating at 180° C. for 3 d, the sample was fully crystallized.

Figure 6:
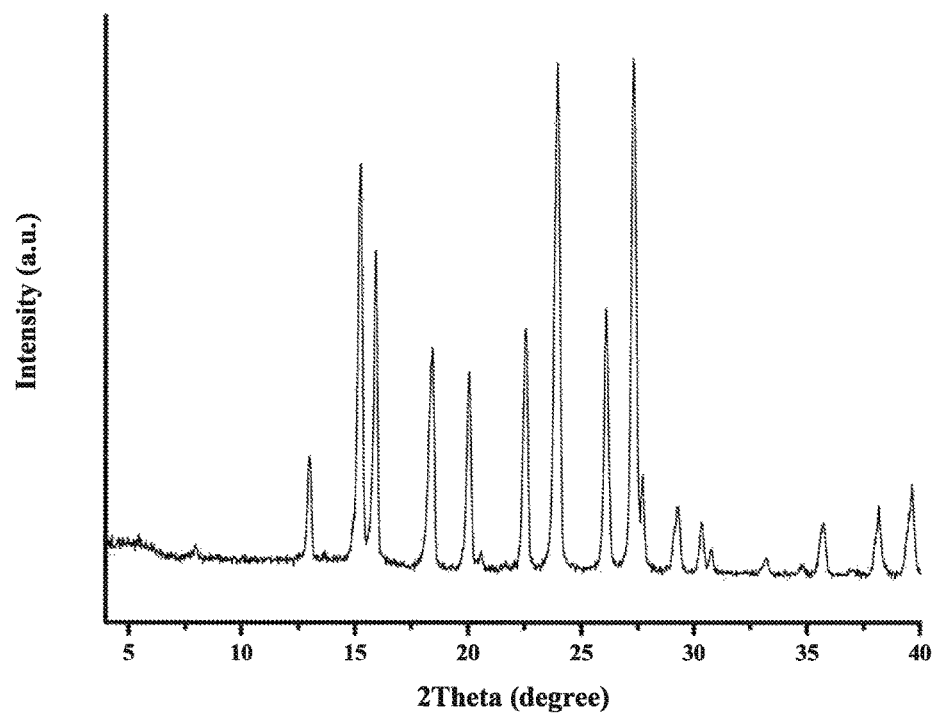

The XRD pattern of the zeolite product obtained in Example 5 which displays the MTN-type framework structure is shown in FIG. 6.

Example 6: Solidothermal Synthesis of B-ZSM-5

1.6 g of solid silica gel (Qingdao Haiyang Chemical Reagent Co., Ltd.), 0.15 g of $NH_4F$ (98%, Aladdin Chemistry Co., Ltd.), 0.03 g $B_2O_3$, and 0.25 g of tetrapropylammonium bromide (98%, Aladdin Chemistry Co., Ltd.) were added into a mortar one by one and mixed together. After grinding for 5 minutes, the powder mixture was transferred to an autoclave and sealed. After heating at 180° C. for 15 h, the sample was fully crystallized. Analysis of the sample via inductively couples plasma (ICP) afforded a silicon to boron molar ratio of 31 for the product.

Example 7: Solidothermal Synthesis of Fe-ZSM-5

1.6 g of solid silica gel (Qingdao Haiyang Chemical Reagent Co., Ltd.), 0.3 g of $NH_4F$ (98%, Aladdin Chemistry Co., Ltd.), 0.07 g $FeCl_3$, and 0.3 g of tetrapropylammonium bromide (98%, Aladdin Chemistry Co., Ltd.) were added into a mortar one by one and mixed together. After grinding for 5 minutes, the powder mixture was transferred to an autoclave and sealed. After heating at 180° C. for 15 h, the sample was fully crystallized. Analysis of the sample via inductively couples plasma (ICP) afforded a silicon to iron molar ratio of 80 for the product.

Example 8: Solidothermal Synthesis of ITQ-13

1.6 g of $SiO_2$, 1.0 g of $NH_4F$, 0.3 g of hexamethonium bromide, and 0.05 g of ITQ-13 seeds were added into a mortar one by one and mixed together. After grinding for 5 minutes, the powder mixture was transferred to an autoclave and sealed. After heating at 180° C. for 18 h, the sample was fully crystallized. The BET surface area of the product as determined according to ISO 9277:2010 afforded a value of 325 $m^2/g$, wherein the t-plot of the micropore area afforded a value of 319 $m^2/g$ and the t-plot of the micropore volume a value of 0.15 $cm^3/g$.

Figure 7:
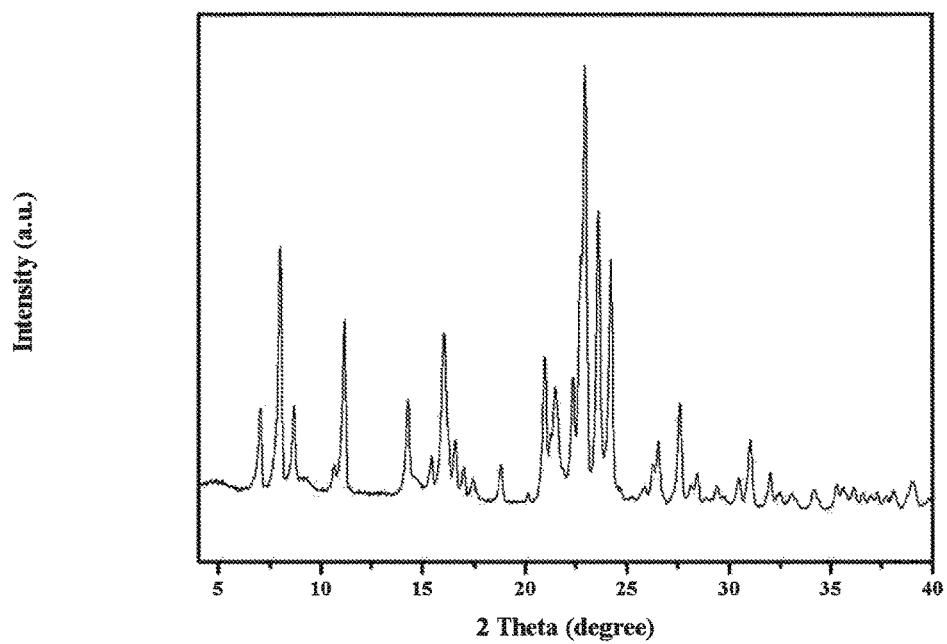

The XRD pattern of the zeolite product obtained in Example 8 which displays the ITH-type framework structure is shown in FIG. 7.

Figure 8:
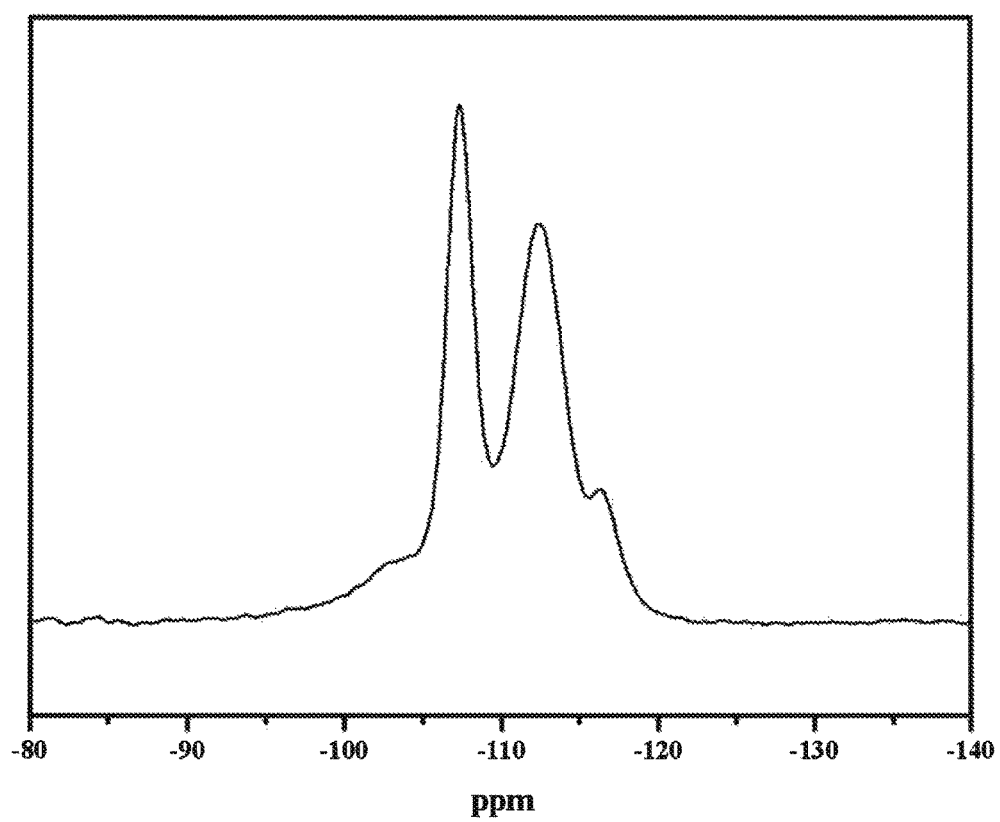
FIGS. 8 and 11 show the $^{29}$Si MAS NMR obtained from the samples from Example 8 and 9, respectively, wherein the values in ppm are plotted along the abscissa.
Figure 9:
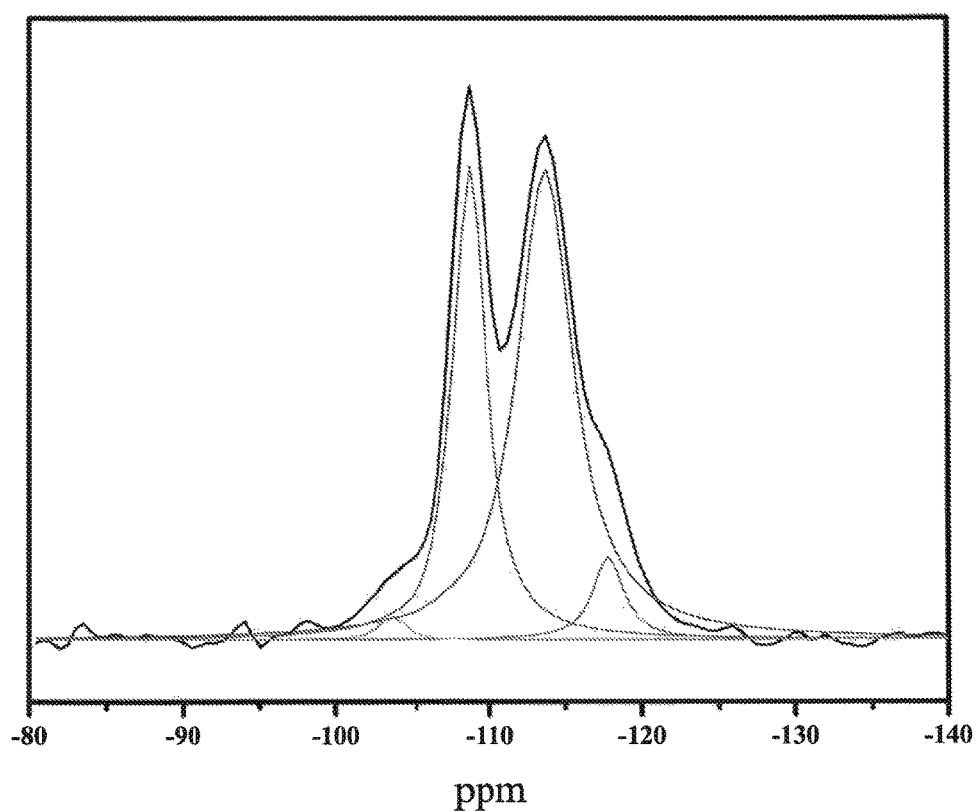
FIG. 9 shows the (deconvoluted) $^{29}$Si CP-MAS NMR obtained from the sample from Example 8, wherein the values in ppm are plotted along the abscissa.

Furthermore, the $^{29}Si$ MAS NMR spectrum as well as the deconvoluted $^{29}Si$ CP-MAS NMR spectrum of the crystalline product is displayed in FIGS. 8 and 9, respectively. In FIG. 8, peaks are found in the $^{29}Si$ MAS NMR spectrum at −107.3, −112.5, and −116.3 ppm, respectively. In FIG. 9, the deconvolution of the $^{29}Si$ CP-MAS NMR spectrum afforded peaks at −108.8 ppm (34.6%), −113.6 ppm (58.5%), −117.9 ppm (5.7%), and −103.5 ppm (1.2%), wherein the integration value for the respective peak is indicated in parentheses.

Example 9: Solidothermal Synthesis of ITQ-17

1.6 g of $SiO_2$, 0.5 g of $NH_4F$, and 1.1 g of triethylenediamine were added into a mortar one by one and mixed together. After grinding for 5 minutes, the powder mixture was transferred to an autoclave and sealed. After heating at 140° C. for 9 d, the sample was fully crystallized. The BET surface area of the product as determined according to ISO 9277:2010 afforded a value of 541 $m^2/g$, wherein the t-plot of the micropore area afforded a value of 508 $m^2/g$ and the t-plot of the micropore volume a value of 0.24 $cm^3/g$.

Figure 10:
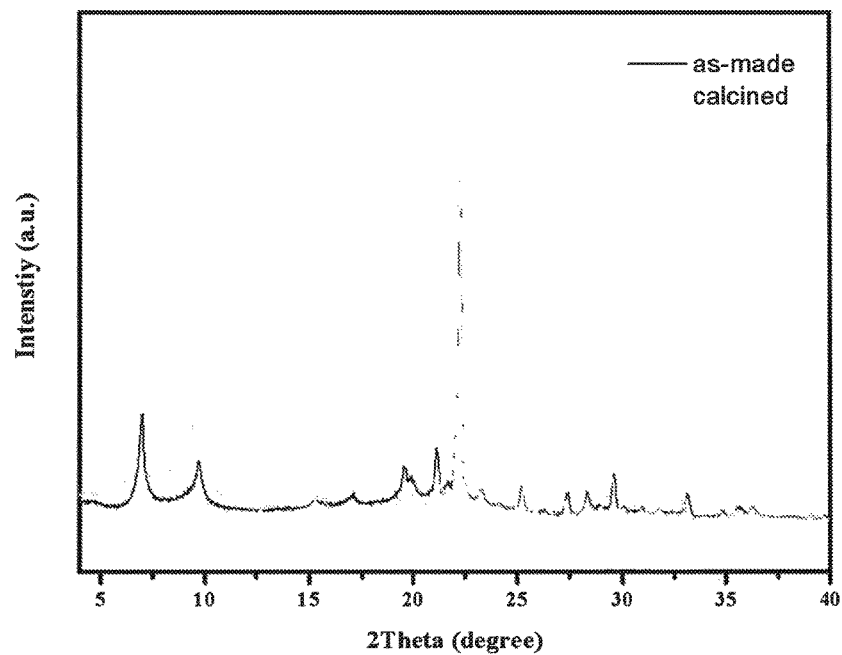
FIG. 10 shows the X-ray diffraction pattern (measured using Cu K alpha-1 radiation) of the crystalline material obtained according to Example 9. The diffraction pattern displayed with a solid black line was obtained from the crystalline material as-synthesized, whereas the diffraction pattern displayed with a solid grey line was obtained from the calcined product. In the figures, the angle 2 theta in ° is shown along the abscissa, and the intensity in arbitrary units is plotted along the ordinate.

The XRD pattern of the zeolite product obtained in Example 8 which displays the BEG-type framework structure is shown in FIG. 10, wherein the diffractogram obtained from the product as synthesized is shown as solid black line and the diffractogram obtained from the calcined product is shown as solid grey line.

Figure 11:
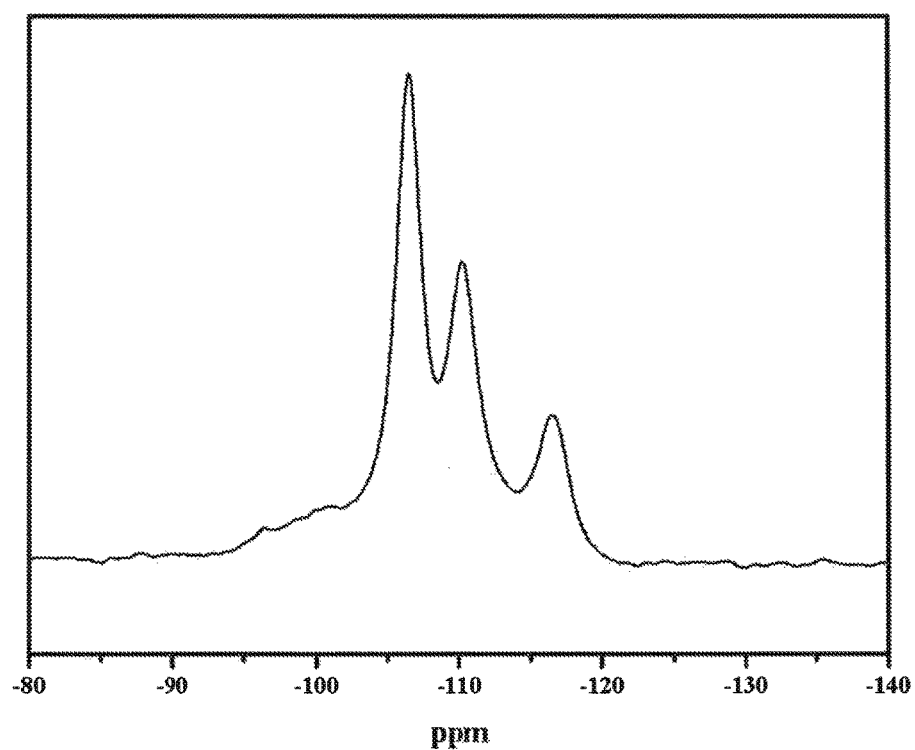

Furthermore, the $^{29}Si$ MAS NMR spectrum of the crystalline product is displayed in FIG. 11.

Example 10: Solidothermal Synthesis of ITQ-12

1.6 g of $SiO_2$, 1.5 g of $NH_4F$, and 1.5 g of 1,2,3-trimethylimidazolium iodide were added into a mortar one by one and mixed together. After grinding for 5 minutes, the powder mixture was transferred to an autoclave and sealed. After heating at 180° C. for 3 d, the sample was fully crystallized.

Figure 12:
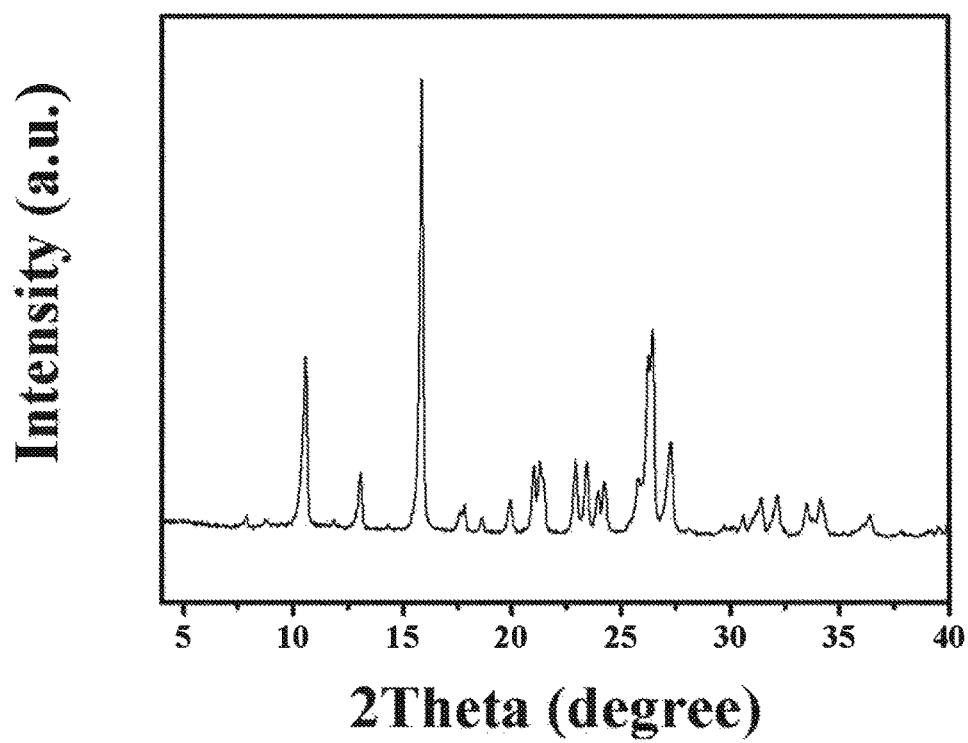

The XRD pattern of the zeolite product obtained in Example 10 which displays the ITW-type framework structure is shown in FIG. 12.

The invention claimed is:

1. A process for the preparation of a zeolitic material comprising $YO_2$ in its framework structure, wherein Y is a tetravalent element, wherein said process comprises the steps of:
   (1) providing a mixture comprising one or more sources for $YO_2$, one or more fluoride containing compounds, and one or more structure directing agents;
   (2) crystallizing the mixture obtained in step (1) for obtaining a zeolitic material comprising $YO_2$ in its framework structure;
      wherein the mixture provided in step (1) and crystallized in step (2) contains 35 wt.-% or less of $H_2O$ based on 100 wt.-% of $YO_2$ contained in the mixture provided in step (1) and crystallized in step (2);

wherein the molar ratio of the one or more structure directing agents:$YO_2$ in the mixture provided in step (1) and crystallized in step (2) is in the range of from 0.1 to 0.25, wherein the zeolitic material crystallized in step (2) has a framework structure selected from the group consisting of BEA, BEC, CHA, EUO, FAU, FER, HEU, ITH, ITW, LEV, MEL, MOR, MWW, and TON.

2. The process of claim 1, wherein Y is selected from the group consisting of Si, Sn, Ti, Zr, Ge, and mixtures thereof.

3. The process of claim 1, wherein the one or more fluoride containing compounds comprise one or more fluoride salts and/or hydrogen fluoride.

4. The process of claim 1, wherein the one or more structure directing agents provided in step (1) comprise one or more organic compounds.

5. The process of claim 1, wherein the molar ratio of fluoride:$YO_2$ in the mixture provided in step (1) and crystallized in step (2) is in the range of from 0.01:1 to 5:1.

6. The process of claim 1, wherein seed crystals are further provided in step (1).

7. The process of claim 1, wherein one or more sources of $X_2O_3$ are further provided in step (1), wherein X is a trivalent element.

8. The process of claim 1, wherein crystallization in step (2) comprises heating of the mixture.

9. The process of claim 8, wherein in step (2) the mixture is crystallized under autogenous pressure.

10. A zeolitic material comprising $YO_2$ in its framework structure obtained by the process of claim 1.

11. A zeolitic material comprising $SiO_2$ in its framework structure, wherein in the $^{29}Si$ MAS NMR spectrum of the as-synthesized zeolitic material the ratio of the total integration value of the peaks associated to Q3 signals to the total integration value of the peaks associated to Q4 signals is in the range of from 0:100 to 20:80;

wherein the zeolitic material has a framework structure selected from the group consisting of BEA, BEC, CHA, EUO, FAU, FER, HEU, ITH, ITW, LEV, MEL, MOR, MWW, and TON.

12. The zeolitic material of claim 11, wherein the peaks associated to Q3 signals refer to the peaks in the $^{29}Si$ MAS NMR spectrum located in the range of from −95 to −108.75 ppm, and wherein the peaks associated to Q4 signals refer to the peaks in the $^{29}Si$ MAS NMR spectrum located in the range of from −108.76 to −125 ppm.

13. A molecular sieve, an adsorbent for ion-exchange, a catalyst or a catalyst support comprising the zeolitic material according to claim 11.

* * * * *